(12) United States Patent
Fukaya et al.

(10) Patent No.: US 8,992,096 B2
(45) Date of Patent: Mar. 31, 2015

(54) OPTICAL MODULE PACKAGE

(71) Applicants: Hiroshi Fukaya, Shatin (HK); Nai Kang Liang, Dongguan (CN)

(72) Inventors: Hiroshi Fukaya, Shatin (HK); Nai Kang Liang, Dongguan (CN)

(73) Assignees: SAE Magnetics (H.K.) Ltd, Shatin, N.T. (HK); SAE Technologies Development Co. Ltd., Dongguan, Guangdong Province (CN)

( * ) Notice: Subject to any disclaimer, the term of this patent is extended or adjusted under 35 U.S.C. 154(b) by 69 days.

(21) Appl. No.: 13/939,136

(22) Filed: Jul. 10, 2013

(65) Prior Publication Data

US 2014/0314378 A1   Oct. 23, 2014

(30) Foreign Application Priority Data

Jun. 3, 2013 (JP) ................................. 2013-116961

(51) Int. Cl.
   *G02B 6/38* (2006.01)
(52) U.S. Cl.
   CPC .................................... *G02B 6/3801* (2013.01)
   USPC ................... 385/70; 385/71; 385/76; 385/87; 385/88; 385/92
(58) Field of Classification Search
   CPC .. G02B 6/3825; G02B 6/3897; G02B 6/3849; G02B 6/3893; G02B 6/3885
   USPC ................ 385/53, 70, 71, 76, 87, 88, 92
   See application file for complete search history.

(56) References Cited

U.S. PATENT DOCUMENTS

| | | | | |
|---|---|---|---|---|
| 4,889,405 A | * | 12/1989 | Walker et al. | 385/55 |
| 8,447,157 B2 | * | 5/2013 | Carpenter et al. | 385/137 |
| 2010/0150501 A1 | * | 6/2010 | Cox et al. | 385/48 |

FOREIGN PATENT DOCUMENTS

| | | |
|---|---|---|
| JP | S63-205617 | 8/1988 |
| JP | H7-92342 | 4/1995 |
| JP | H8-94875 | 4/1996 |
| JP | H10-206681 | 8/1998 |
| JP | 2006-30552 | 2/2006 |

* cited by examiner

*Primary Examiner* — Jennifer Doan
(74) *Attorney, Agent, or Firm* — K&L Gates LLP

(57) ABSTRACT

An optical module package is provided, the optical module package including a housing main body, a cover body, first and second holding members, and a fiber unit. The first and second holding members may form, inside thereof, a unit accommodating part according to the outer size of a fiber unit in a direct opposing state. The housing main body has locking projections set an arrangement interval between two opposing surfaces of outer surface of the first and second holding members arranged to oppose each other, and a space sandwiched between locking projections is set as an accommodating space for the first and second holding members.

20 Claims, 28 Drawing Sheets

OPTICAL MODULE PACKAGE

CROSS-REFERENCE TO RELATED APPLICATIONS

This application is based on and claims priority to Chinese Patent Application No. 201310140722.2 filed Apr. 22, 2013 and Japanese Patent Application No. 2013-116961 filed Jun. 3, 2013, the entire contents of which are incorporated herein by reference.

FIELD

The present disclosure relates to an optical module package in which a fiber unit, the fiber unit including an optical waveguide device and an optical fiber connected to each other, is accommodated in a housing.

BACKGROUND

Conventional optical module packages are known which include an optical waveguide device formed with a plurality of branched optical waveguides connected with an optical fiber and having the device accommodated in a housing.

A problem with conventional optical module packages is that an adhesive typically applied to a portion where the optical waveguides are connected with the optical fiber absorbs moisture and thereby decreases in adhesive strength between the optical waveguides and the optical fiber.

A conventional approach to address the problem is to fix a fiber unit to a housing an adhesive or resin during manufacture of an optical module package, such that a fiber unit including an optical waveguide device and an optical fiber connected to each other is accommodated in the housing. By way of example, the following references are identified: Japanese Laid-open Patent Publication No. H7-92342 (also referred to as Patent Document 1); Japanese Laid-open Patent Publication No. H8-94875 (also referred to as Patent Document 2); Japanese Laid-open Patent Publication No. 2006-30552 (also referred to as Patent Document 3); and Japanese Laid-open Patent Publication No. S63-205617 (also referred to as Patent Document 4). However, because the fiber unit is fixed to the housing an adhesive or resin in the case of the optical module package disclosed in each of above Patent Documents, the following problems have not been solved.

In general, adhesives are often expensive. Further, in the case of using an adhesive, great attention needs to be paid to prevent the adhesive from adhering to other parts during the process of manufacturing the optical module package, and a process of curing the adhesive after application of the adhesive to a member is required. In particular, at the time when the fiber unit is fixed to the housing the adhesive, the adhesive needs to be injected or the like into the housing. At the injection or the like, the adhesive sometimes adheres to unintended locations of the housing, and avoidance of the adhesion requires effort.

Also in the case of using resin, there is a problem in which a process of curing the resin is required after filling it in the housing, and therefore time and effort is required for manufacture. Accordingly, the optical module package in a structure in which the fiber unit is fixed to the housing an adhesive or resin has a problem of requiring time and effort for manufacture.

Alternatively, there is another approach of using a spacer other that the above in order to fix the fiber unit in the housing. However, since the spacer needs to be fixed to the housing an adhesive or resin also in this case, the problem of requiring effort and time for manufacture has not been able to be solved.

With further regard to the Patent Documents 1 to 4, the disclosed optical module packages disclosed have a structure in which the optical fiber is inserted into a tubular member or an insertion hole provided in the housing. Therefore, the optical module packages according to these references requires more effort and time for manufacture due to insertion work of the optical fiber which cannot be avoided in the process of manufacture.

In this regard, the work of inserting the optical fiber into the tubular member or the like can be made unnecessary in the optical module package disclosed in Japanese Laid-open Patent Publication No. H10-206681 (also referred to as Patent Document 5). However, in the case of this optical module package, a plurality of kinds of resins need to be filled in the housing after the fiber unit is accommodated in the housing. In addition, a process of curing each resin needs to be performed every time when each resin is filled, and therefore much time and effort are required for manufacturing processes.

As described above, it is difficult to reduce the effort and time required for manufacture in the respective conventional arts because the fiber unit is fixed to the housing an adhesive or resin.

SUMMARY OF EMBODIMENTS

The present disclosure is directed to an optical module package in which an optical waveguide device formed with an optical waveguide and an optical fiber connected to the optical waveguide device are accommodated in a housing and the optical fiber and the optical waveguide device are held in the housing a unit holding member. The housing includes a housing main body in which a fiber unit including the optical waveguide device and the optical fiber connected to each other is accommodated together with the unit holding member while the optical fiber is kept extending along an axial core direction, and a cover body which covers the housing main body. The unit holding member includes a first holding member and a second holding member, and the first holding member and the second holding member form, inside thereof, a unit accommodating part to accommodate the fiber unit while locking the fiber unit, in a direct opposing state of opposing each other in direct contact with each other and the housing main body or the cover body has a plurality of locking parts. The plurality of locking parts are formed at an interval according to an arrangement interval between two opposing surfaces being outer surfaces of the unit holding member and arranged to oppose each other, or formed at positions opposing each other when the cover body is put over the housing main body, and a space sandwiched between the plurality of locking parts in the housing main body or the cover body is set as an accommodating space for the unit holding member.

In the above-described optical module package embodiment, the fiber unit is accommodated in the unit accommodating part formed by the first and second holding members while the optical fiber is kept extending along the axial core direction, and the first and second holding members are accommodated in the accommodating space of the housing main body. In this event, the plurality of locking parts of the housing main body come into contact with the two opposing surfaces of the unit holding member.

In the above-described optical module package embodiment, it is possible that the housing main body has the plurality of locking parts, and the plurality of locking parts are arranged distanced from each other along a long side direction along a long side of the housing main body and have an interval therebetween along the long side direction set to a length according to an arrangement interval between long side opposing surfaces along the long side direction in the two opposing surfaces of the unit holding member. This brings the plurality of locking parts into contact with the long side opposing surfaces of the unit holding member, and thereby restricting the movement of the unit holding member in the long side direction.

In case of the above-described optical module package embodiment, it is possible that each of the housing main body and the cover body has respectively at least one locking part constituting the plurality of locking parts, and an arrangement pattern of the locking parts in the housing main body is in common with an arrangement pattern of the locking parts in the cover body. Thus, the housing main body and the cover body have the respective locking parts, so that the movement of the unit holding member is restricted by them.

In the above-described optical module package embodiment, it is possible that the housing main body has two bottom locking parts constituting the plurality of locking parts formed at a main body bottom part in a U-figure like body formed in an substantially (e.g., almost) U-Figure shape, and has wall locking parts constituting the plurality of locking parts formed respectively at two main body wall parts connecting to the main body bottom part in the U-figure like body.

In the above-described optical module package embodiment, it is possible that the housing main body has a plurality of bottom locking parts constituting the locking parts formed at a main body bottom part in a U-figure like body formed in an substantially (e.g., almost) U-Figure shape, and the cover body is formed in an substantially (e.g., almost) U-Figure shape covering the housing main body from above and having two cover wall parts coming into close contact with two main body wall parts connecting to the main body bottom part of the housing main body from outside and a top end part connecting the two cover wall parts, and has a plurality of top end locking parts constituting the locking parts formed at the top end part.

In the above-described optical module package, it is possible that the cover body is formed in an substantially (e.g., almost) U-Figure shape covering the housing main body from above and having two cover wall parts coming into close contact with the main body wall parts from outside and a top end part connecting the two cover wall parts, and has engaging parts engaging with the wall locking parts from outside formed respectively at the cover wall parts.

In certain embodiments it is preferable that when the cover body is put over the housing main body and the top end part is brought into contact with an open end part of the main body wall part not connecting to the main body bottom part, an interval between the top end locking part and the bottom locking part is slightly smaller than an arrangement interval between the two opposing surfaces of the unit holding member.

In certain embodiments it is preferable that each of the first holding member and the second holding member has a device receiving part facing the unit accommodating part, and the fiber unit is configured such that fiber connectors to which the optical fiber is connected are connected to both sides of the optical waveguide device, the device receiving part of each of the first holding member and the second holding member is configured such that connector locking parts locking the fiber connectors are formed on both sides of a device locking part locking the optical waveguide device, at positions distanced from the device locking part, and the cover body has an unevenly arranged structure in which the top end locking parts are arranged at positions according to the device locking part but not arranged at positions according to the connector locking parts.

In the above-described optical module package embodiment, it is possible that the housing main body has the accommodating space formed by an accommodating recess (e.g., concave) part in a tub-like shaped body, and has the plurality of locking parts formed by long side inner wall parts arranged along a long side direction along a long side of the housing main body of inner wall parts facing the accommodating recess part, and the accommodating recess part has a stepped structure including a deep bottom part with a large depth and a shallow bottom part shallower than the deep bottom part arranged outside the deep bottom part, and the first holding member has a stepped raised (e.g., convex) part fitted in the accommodating recess part in the tub-like shaped body and having a shape according to the stepped structure of the accommodating recess part, and the two opposing surfaces are formed by two long side end faces along the long side direction of the stepped raised part. In this optical module package, the long side inner wall parts facing the accommodating recess part in the tub-like shaped body come into contact with the two long side end faces of the first holding member to restrict the movement of the first holding member.

In the above-described optical module package embodiment, it is preferable that the second holding member has a stepped raised part according to the stepped raised part of the first holding member, and the cover body is formed with a recess part to which the stepped raised part of the second holding member is fitted, and is a tub-like shaped body similar to the housing main body.

It is possible that both of the first holding member and the second holding member are formed in a plate-shape using soft members with rubber elasticity, and when the first holding member and the second holding member sandwich the fiber unit therebetween, the first holding member and the second holding member are sandwiched at outside thereof between the cover body and the housing main body, and the cover body is attached to the housing main body, the first holding member and the second holding member come into close contact with the fiber unit while deforming according to the recess parts of the housing main body and the cover body respectively.

It is possible in some embodiments that both of the first holding member and the second holding member have protruding edge parts protruding outward from the cover body and the housing main body.

In certain embodiments, it is preferable that the optical fiber is fixed to the protruding edge parts of the first holding member and the second holding member using an adhesive.

As described above, according to the present disclosure, it becomes possible to manufacture an optical module package in which an optical waveguide device and an optical fiber are connected to each other and accommodated in a housing, without the necessity of using an adhesive or resin to fix the fiber unit to the housing nor insert the optical fiber into a tubular member, thereby reducing the effort and time required for manufacture.

BRIEF DESCRIPTION OF THE DRAWINGS

The present disclosure will be more fully understood from the detailed description given hereinbelow and the accompa

DETAILED DESCRIPTION OF THE EMBODIMENTS

The following embodiments of the present disclosure will be described with reference to the drawings. It is noted that the same components will be referred to with the same numerals or letters, while omitting their overlapping descriptions. The present disclosure is made to solve the above-identified problems, and to make it possible to manufacture an optical module package in which an optical waveguide device and an optical fiber are connected to each other and accommodated in a housing, without the necessity of using an adhesive or resin to fix the fiber unit to the housing nor insert the optical fiber into a tubular member, thereby reducing the effort and time required for manufacture.

First Embodiment

Optical Module Package Structures

Figure 1:
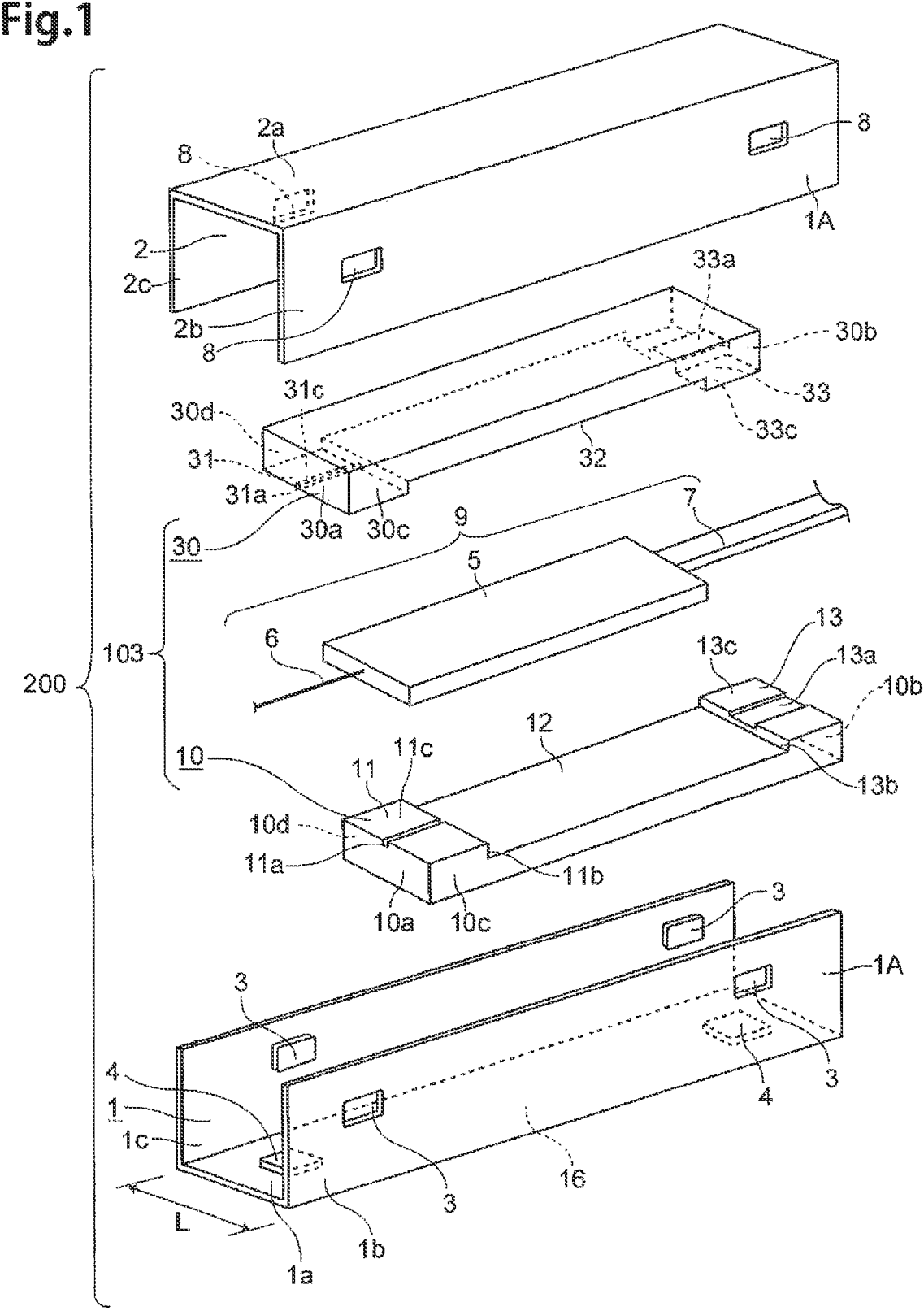
- FIG. 1 is an exploded perspective view illustrating an optical module package according to a first embodiment.
Figure 2:
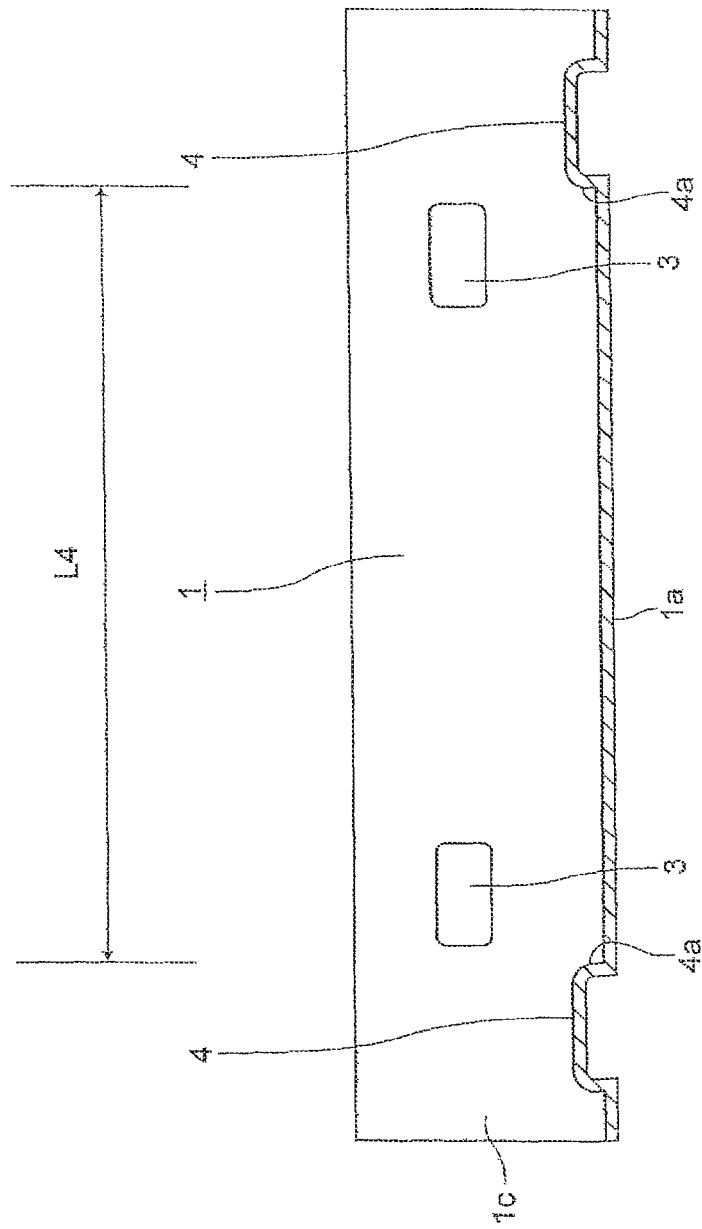
FIG. 2 is a sectional view illustrating a housing main body of FIG. 1, which is cut along the long side direction at the center of a short side direction.
Figure 3:
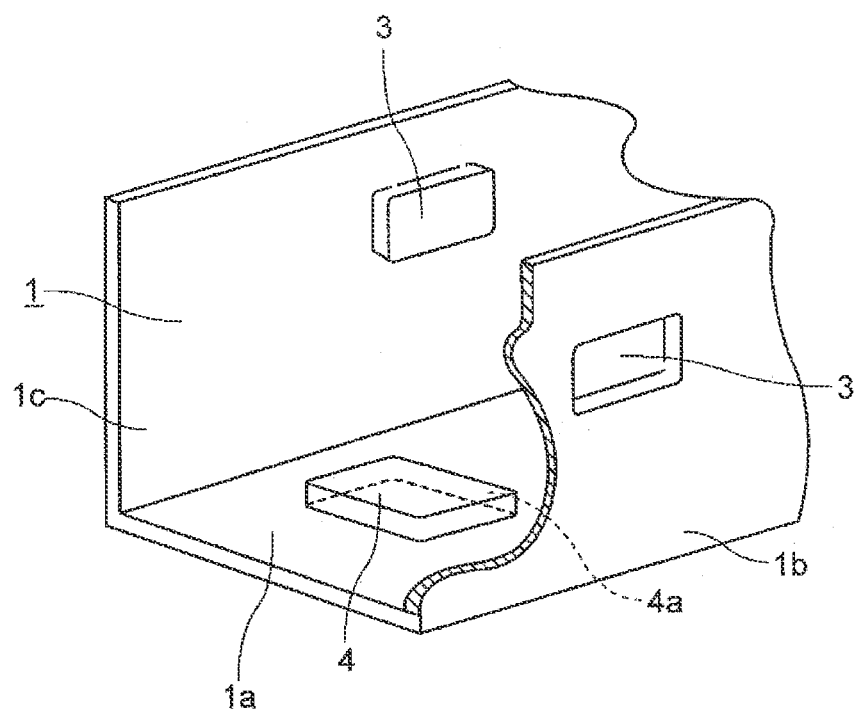
FIG. 3 is a perspective view illustrating a principal part of the housing main body of FIG. 1, which is partially broken.
Figure 4:
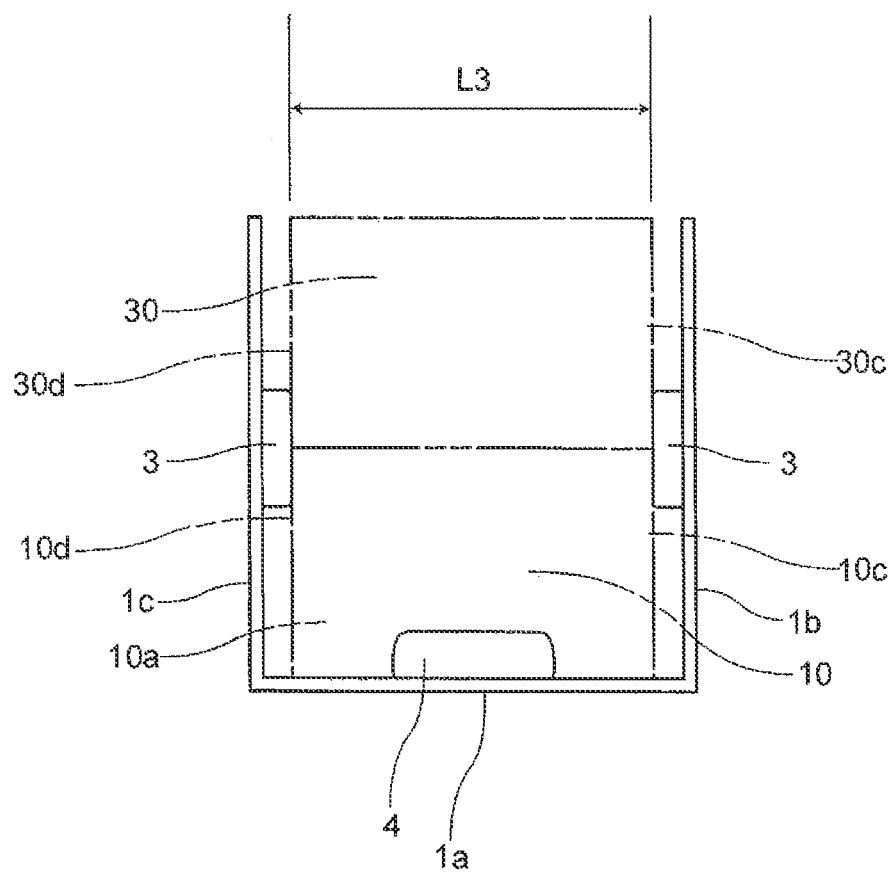
FIG. 4 is a front view illustrating a configuration which the housing main body accommodates a first holding member and a second holding member.
Figure 5:
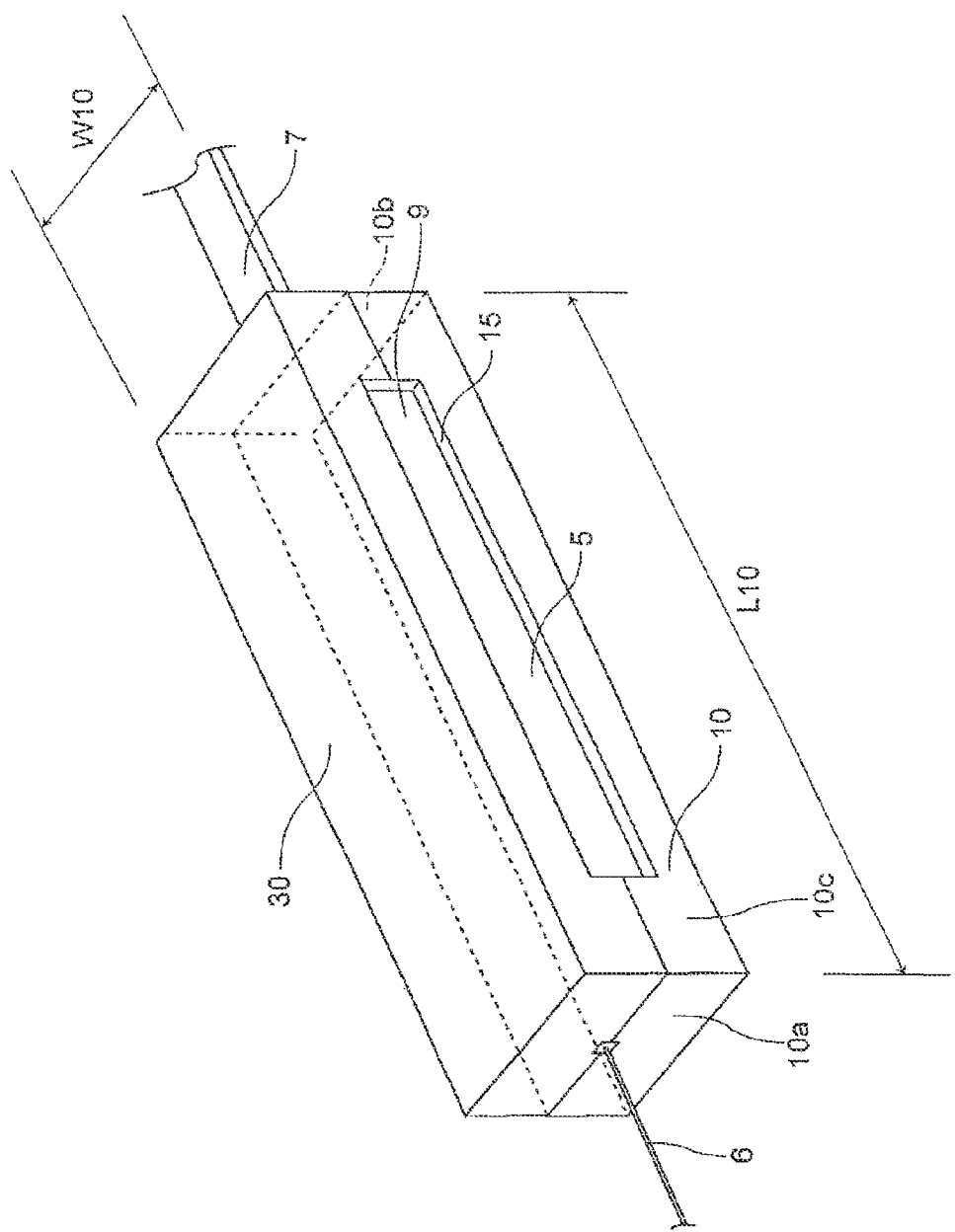
FIG. 5 is a perspective view illustrating the first holding member and the second holding member which accommodate a fiber unit.
Figure 6:
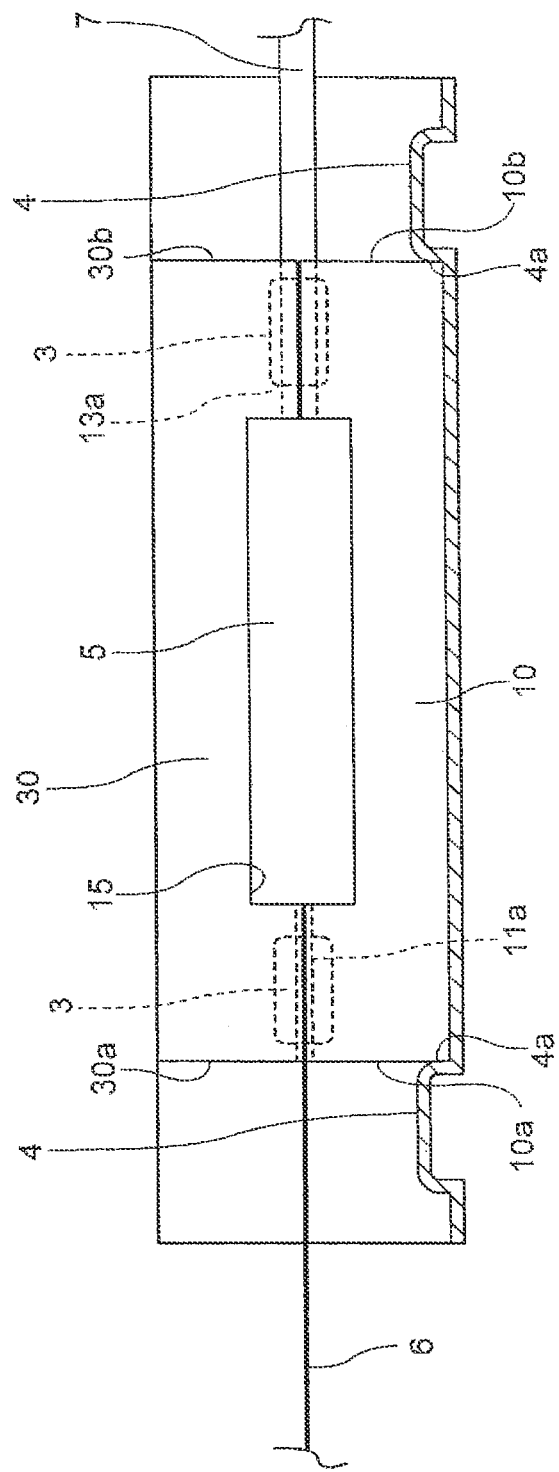
FIG. 6 is a side elevation view illustrating the optical module package without cover body mounting, which was illustrated with cutting of the housing main body.
Figure 7:
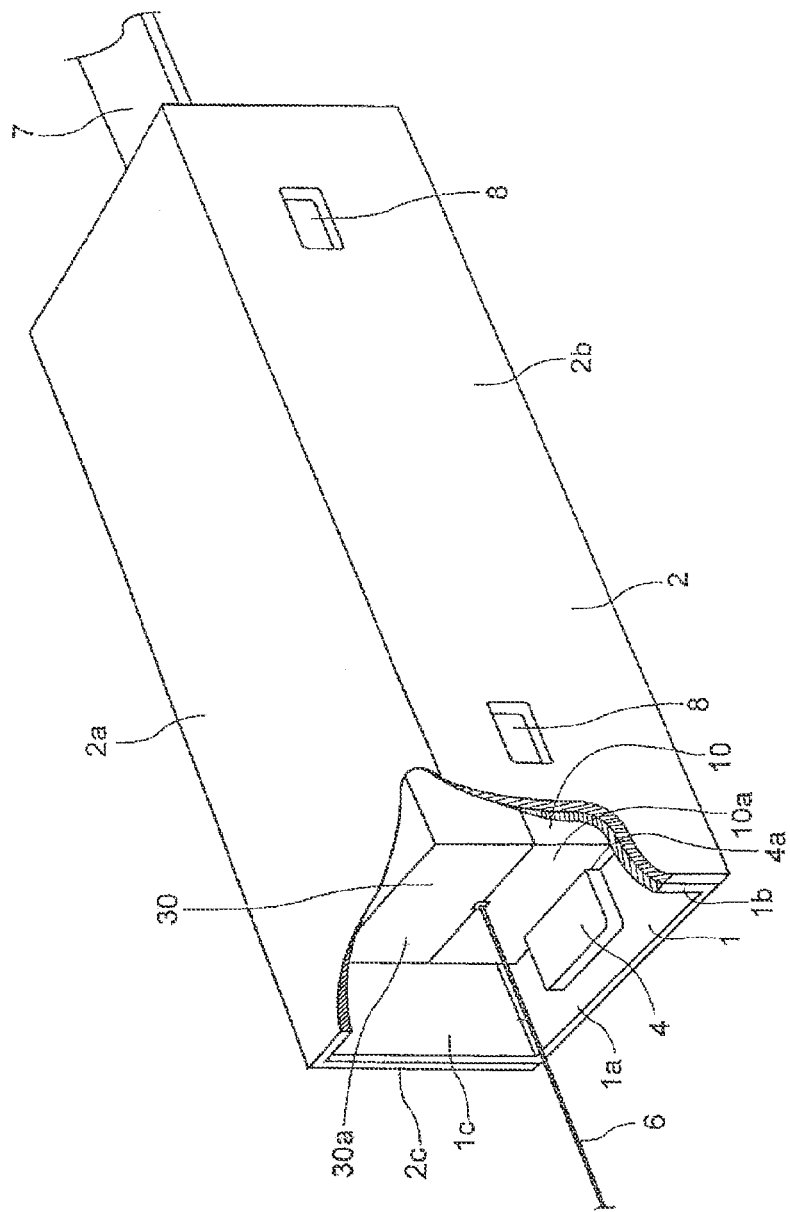
FIG. 7 is a perspective view illustrating the optical module package, which the housing main body and the cover body are partially broken.

The structure of an optical module package 200 according to the first embodiment of the present disclosure will be explained with reference to FIG. 1 to FIG. 7. Here, FIG. 1 is an exploded perspective view illustrating the optical module package 200 according to the first embodiment. FIG. 2 is a sectional view illustrating the housing main body 1, which is cut along the long side direction at the center of short side direction. FIG. 3 is a perspective view illustrating a principal part of the housing main body 1, which is a partially broken view. FIG. 4 is a front view illustrating a configuration which the housing main body 1 accommodates the first, second holding members 10, 30. FIG. 5 is a perspective view illustrating the first, second holding members 10, 30 which accommodate a fiber unit 9. FIG. 6 is a side elevation view illustrating the optical module package 200 before mounting of the cover body, which was illustrated with cutting of the housing main body 1. FIG. 7 is a perspective view illustrating the optical module package 200, which the housing main body 1 and the cover body 2 are partially broken.

The optical module package 200 includes a housing 1A having the housing main body 1 and the cover body 2, the fiber unit 9, the first holding member 10 and the second holding member 30.

In the optical module package 200, two bottom locking projections 4, 4 of the housing main body 1 lock side surfaces 10a, 10b of the first holding member 10, and four wall locking projections 3, 3, 3, 3 lock side surfaces 10c, 10d, 30c, 30d of the first, second holding member 10, 30 to restrict the movement of the first, second holding members 10, 30. Thus, the optical module package 200 can be manufactured without using an adhesive or resin to fix the fiber unit 9 to the housing 1A nor inserting the optical fiber into a tubular member, resulting in reduction in effort and time required for manufacture.

The housing main body 1 is a U-figure like body which is formed of metal or plastic and formed in a substantially (e.g., almost) U-Figure shape. The housing main body 1 has, as illustrated in FIG. 1, a main body bottom part 1a and two main body wall parts 1b, 1c opposing each other. The housing main body 1 has a width (short side width) in a direction along a short side inside the main body bottom part 1*a* (the direction along the short side is also referred to as a "short side direction") set to L. Further, the housing main body 1 has a length enough to accommodate an optical fiber member 6 of the fiber unit 9 with a predetermined length, together with the first, second holding members 10, 30.

Further, the main body bottom part 1*a* has the two bottom locking projections 4, 4 formed thereon. Each of the bottom locking projections 4 is formed by locally projecting the main body bottom part 1*a* from the outside to the inside or the like (see e.g., FIG. 2).

The bottom locking projections 4, 4 are arranged at positions in a straight line along a direction of a long side of the housing main body 1 (the direction along the long side is also referred to as a "long side direction"). The bottom locking projections 4, 4 each have a generally rectangular shape in a plan view, and the bottom locking projections 4, 4 have one side part (shown as side portion 4*a*) of four side parts, which oppose each other. The interval along the long side direction between the bottom locking projections 4, 4 (the interval along the long side direction between the side parts 4*a*) is set to L4. The interval L4 corresponds to a later-described arrangement interval L10 of the first holding member 10.

In the housing main body 1, a space sandwiched between the bottom locking projections 4, 4 is set to an accommodating space 16 for the first, second holding members 10, 30.

Each of the main body wall parts 1*b*, 1*c* has two wall locking projections 3, 3 formed thereon. Each of the wall locking projections 3 is formed, similarly to the bottom locking projections 4, by locally projecting the main body wall part 1*b*, 1*c* from the outside to the inside or the like.

Further, in each of the main body wall parts 1*b*, 1*c*, the interval along the long side direction between the two wall locking projections 3 and 3 is shorter than L4. Therefore, all of the wall locking projections 3, 3 are arranged in the accommodating space 16. Further, the height of the location where each of the wall locking projections 3, 3 (the height from the main body bottom part 1*a*) corresponds to the height of a portion where the first holding member 10 is in contact with the second holding member 30 (see FIG. 4).

The two wall locking projections 3, 3 of the main body wall part 1*b* and the two wall locking projections 3, 3 of the main body wall part 1*c* are arranged at positions opposing each other. The intervals along the short side direction between them are L3 illustrated in FIG. 4. The L3 corresponds to a later-described arrangement interval W10 of the first holding member 10.

The cover body 2 is a U-figure like body which is formed of metal or plastic and formed in a substantially (e.g., almost) U-Figure shape, similarly to the housing main body 1. The cover body 2 has a top end part 2*a* and two cover wall parts 2*b*, 2*c* opposing each other, and is formed in a size covering the housing main body 1 from the upper side. Further, the short side width of the top end part 2*a* is slightly larger than the short side width L of the housing main body 1, and the cover wall parts 2*b*, 2*c* are formed in a size according to the main body wall parts 1*b*, 1*c* of the housing main body 1. When the cover body 2 is put over the housing main body 1, the cover wall parts 2*b*, 2*c* come into close contact with the main body wall parts 1*b*, 1*c* of the housing main body 1 from the outside, and the upper surface of the housing main body 1 is covered with the top end part 2*a* as illustrated in FIG. 7.

Further, two engaging projections 8, 8 are formed in each of the cover wall parts 2*b*, 2*c*. Each of the engaging projections 8 is formed, similarly to the wall locking projection 3, by locally projecting the cover wall part 2*b*, 2*c* from the outside to the inside or the like. Further, each of the engaging projections 8 is arranged at a position corresponding to each of the wall locking projections 3, and its shape also corresponds to that of each wall locking projection 3. When the cover body 2 is put over the housing main body 1, each engaging projection 8 is engaged with each wall locking projection 3 from the outside.

The fiber unit 9 is constituted such that the optical fiber member 6 and a tape-shaped optical fiber member 7 are connected to an optical waveguide device 5 which are united together.

Figure 28:
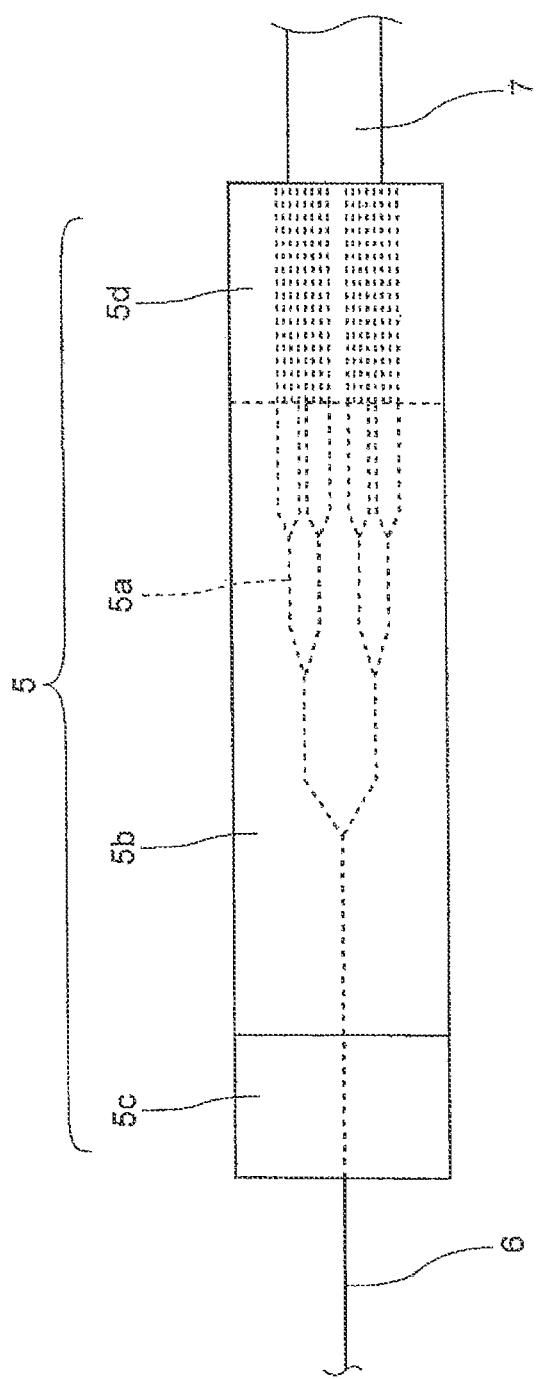
FIG. 28 is a plan view illustrating an outline constitution of the fiber unit.

The optical waveguide device 5 has a structure that has an optical waveguide substrate 5*b* formed with an optical waveguide 5*a*, and fiber connectors 5*c*, 5*d*, which are united together as illustrated in FIG. 28.

The optical waveguide 5*a* is formed such that multiple waveguide cores are branched off from a single waveguide core. The optical waveguide 5*a* enables light incident from the single waveguide core to be equivalently branched off to the multiple waveguide cores.

The fiber connector 5*c* is a connector to which the single-core optical fiber member 6 is connected, and is fixed to one end part of the optical waveguide substrate 5*b* using a not-illustrated adhesive. The fiber connector 5*d* is a connector to which the multi-core tape-shaped optical fiber member 7 is connected, and is fixed to the other end part of the optical waveguide substrate 5*b* using a not-illustrated adhesive.

The optical fiber member 6 has a structure in which a single-core optical fiber is covered with a coating material. The tape-shaped optical fiber member 7 has a structure in which a plurality of optical fibers (for example, eight) arranged in parallel to each other and covered around with a coating material into a tape shape.

Next, the first holding member 10 and the second holding member 30 will be described referring mainly to FIG. 1. The illustrated first, second holding members 10, 30 may or may not have a common shape. However, the first, second holding members 10, 30 form a later-described unit accommodating part 15 inside the side surfaces 10*a*, 10*b*, 10*c*, 10*d* in a configuration that surfaces of below-described respective raised (e.g., convex) parts 11, 13 and 31, 33 oppose each other in direct contact with each other (this configuration or state is referred also to as a direct opposing state).

The first, second holding members 10, 30 constitute a unit holding member 103 relating to the present disclosure. The first, second holding members 10, 30 are formed using soft members with rubber elasticity. For example, the first, second holding members 10, 30 can be formed using rubbers such as chloroprene rubber, butyl rubber, chlorosulfonation polyethylene rubber, ethylene propylene rubber, acrylonitrile rubber, polysulfide rubber, natural rubber used as industrial rubber packing materials, and other silicon rubber, fluorine-containing rubber, polyacrylic rubber, polyurethane rubber and the like.

The first holding member 10 is a thick plate-like body with a size to be accommodated in the housing main body 1. The first holding member 10 is surrounded by the four side surfaces 10*a*, 10*b*, 10*c*, 10*d*.

The first holding member 10 has two raised parts 11, 13 on both sides in the long side direction, and a portion between them is a device receiving part 12 which is concave as compared with the raised parts 11, 13. The raised part 11 has a narrow groove-shaped fiber receiving part 11*a* formed in a surface 11*c* thereof. The fiber receiving part 11*a* is formed in a shape according to the outer shape of the optical fiber member 6. The raised part 13 has a wide groove-shaped fiber receiving part 13*a* formed in a surface 13*c* thereof. The fiber receiving part 13*a* is formed in a shape according to the outer shape of the tape-shaped optical fiber member 7. The device receiving part 12 has a shape according to the outer dimension of the optical waveguide device 5 (more specifically, common in dimension in the long side direction but approximately half in thickness). End faces 11b, 13b facing the device receiving part 12 are arranged at an interval according to the length of the optical waveguide device 5.

In the first holding member 10, among the four side surfaces 10a, 10b, 10c, 10d, the sides surfaces 10a, 10b oppose each other and the sides surfaces 10c, 10d oppose each other. The side surfaces 10a, 10b correspond to opposing surfaces in the present disclosure, and the sides surfaces 10c, 10d also correspond to opposing surfaces. Among them, the sides surfaces 10a, 10b are arranged separated (e.g., distanced) from each other along the long side direction and therefore correspond to long side opposing surfaces in the present disclosure, and the sides surfaces 10c, 10d are arranged separated (e.g., distanced) from each other along the short side direction and therefore correspond to short side opposing surfaces.

Further, as illustrated in FIG. 5, the arrangement interval between the side surfaces 10a and 10b is set to L10. The arrangement interval L10 is the length of the first holding member 10 and corresponds to the interval L4 between the bottom locking projections 4, 4. Further, the arrangement interval between the side surfaces 10c and 10d is set to W10. The arrangement interval W10 is the width of the first holding member 10 and corresponds to the interval L3 between the wall locking projections 3, 3.

The second holding member 30 is also a thick plate-like body similar to the first holding member 10. The second holding member 30 is surrounded by four side surfaces 30a, 30b, 30c, 30d.

The second holding member 30 has two raised parts 31, 33 on both sides in the long side direction, and a portion between them is a device receiving part 32 similar to the device receiving part 12. The raised part 31 has a fiber receiving part 31a, similar to the fiber receiving part 11a, formed in a surface 31c thereof. The raised part 33 has a fiber receiving part 33a, similar to the fiber receiving part 13a, formed in a surface 33c thereof.

The second holding member 30 has the shape in common with the first holding member 10 and therefore, has the same length and the same width as those of the first holding member 10.

Further, the first holding member 10 and the second holding member 30 can be made to oppose each other with the surfaces of the raised part 11 and raised part 31 in direct contact with each other and the surfaces of the raised part 13 and raised part 33 in direct contact with each other, as illustrated in FIG. 5. In this event, a space is formed in which the fiber receiving parts 11a, 31a, the device receiving parts 12, 32, and the fiber receiving parts 13a, 33a are united together. This space is the unit accommodating part 15. The fiber receiving parts 11a, 31a have a shape according to the optical fiber member 6, and the fiber receiving parts 13a, 33a have a shape according to the tape-shaped optical fiber member 7. Further, the device receiving parts 12, 32 have a shape according to the outer dimension of the optical waveguide device 5. Therefore, the unit accommodating part 15 is formed according to the outer dimension of the fiber unit 9, and has a shape capable of accommodating the fiber unit 9 locked by the device receiving parts 12, 32.

The above-described pair of the first, second holding members 10, 30 and the fiber unit 9 are accommodated in the housing main body 1, and the cover body 2 is put over the housing main body 1 from the upper side, whereby the optical module package 200 is formed. In this case, for example, the first holding member 10 is first accommodated in the accommodating space 16 in the housing main body 1, and the fiber unit 9 is then accommodated in the first holding member 10. In this event, the optical waveguide device 5 is fitted into the device receiving part 12 and, approximately concurrently therewith, the optical fiber member 6 and the tape-shaped optical fiber member 7 are fitted into the fiber receiving parts 11a, 13a respectively.

Next, the second holding member 30 is overlapped on the first holding member 10 such that the surfaces 31c, 33c of the raised parts 31, 33 are brought into direct contact with the surfaces 11c, 13c of the raised parts 11, 13 respectively. Then, the unit accommodating part 15 is formed by the first, second holding members 10, 30, thus making it possible to hold the fiber unit 9 while sandwiched between the first and second holding members 10 and 30 as illustrated in FIG. 5.

Thereafter, the cover body 2 is put over the housing main body 1, and the engaging projections 8, 8 are fitted into the wall locking projections 3, 3 for engagement of them. Then, as illustrated in FIG. 7, the first, second holding members 10, 30 are covered with the top end part 2a. Further, the cover wall parts 2b, 2c come into close contact with the main body wall parts 1b, 1c of the housing main body 1 from outside, whereby the housing main body 1 and the cover body 2 are united together. Thus, the optical module package 200 is completed.

It is noted that the second holding member 30 may be accommodated in the cover body 2 in advance, unlike the above-described procedure. Further, the fiber unit 9 may be held by the first, second holding members 10, 30 in advance, and they may be accommodated together in the housing main body 1.

Operation and Effect of Optical Module Package 200

As in the case above, in the optical module package 200 the fiber unit 9 is held sandwiched between the first and second holding members 10 and 30 as illustrated in FIG. 5, and accommodated in the housing main body 1 in that configuration.

The housing main body 1 is a substantially (e.g., almost) U-figure like body, and the fiber unit 9 is able to be directly inserted and extracted to/from an elongated space sandwiched between the main body wall parts 1b and 1c. Therefore, the housing main body 1 allows the fiber unit 9 to be accommodated therein while the optical fiber member 6 and the tape-shaped optical fiber member 7 are kept extending along the axial core direction without being bent. Consequently, it is unnecessary to insert the optical fiber member 6 into a tubular member when accommodating the fiber unit 9 in the housing main body 1 in the optical module package 200, thus, making it possible to reduce the effort and time required to manufacture the optical module package 200.

Further, the first, second holding members 10, 30 hold the fiber unit 9 while sandwiched therebetween. In this case, the device receiving parts 12, 32 of the first, second holding members 10, 30 have a shape (e.g., form) according to the outer dimension of the optical waveguide device 5, and the end faces 11b, 13b are arranged at the interval according to the length of the optical waveguide device 5. Therefore, the end faces 11b, 13b come into contact with the optical waveguide device 5 and sandwich the optical waveguide device 5 therebetween from both sides in the length direction. Thus, the first, second holding members 10, 30 are able to restrict the movement of the optical waveguide device 5 so as to prevent the optical waveguide device 5 from moving in the long side direction.

Further, the accommodating space 16 is secured in the housing main body 1. The accommodating space 16 is a space sandwiched between the bottom locking projections 4, 4 as described above. The interval along the long side direction between the bottom locking projections 4, 4 is L4, and the interval L4 corresponds to the arrangement interval L10 of the first holding member 10.

Therefore, the first, second holding members 10, 30 can be accommodated in the accommodating space 16. In addition, the first holding member 10 can be brought into contact with the side parts 4a, 4a of the bottom locking projections 4, 4 on both sides in the long side direction. Further, all of the wall locking projections 3 are arranged inside the accommodating space 16. In addition, the interval L3 along the short side direction between the wall locking projections 3, 3 corresponds to the arrangement interval W10 of the first holding member 10. Therefore, the first holding member 10 can also be brought into contact with the wall locking projections 3, 3 on both sides in the short side direction.

Then, the bottom locking projections 4, 4 are able to sandwich the first holding member 10 therebetween from both sides in the long side direction to restrict the movement so as to prevent the first holding member 10 from moving in the long side direction. Furthermore, the wall locking projections 3, 3 are able to also sandwich the first holding member 10 therebetween from both sides in the short side direction to restrict the movement to prevent the first holding member 10 from moving in the short side direction. Moreover, since the height of the wall locking projections 3, 3 corresponds to the height of the portion where the first holding member 10 is in contact with the second holding member 30, the movement of the second holding member 30 is able to be restricted to prevent the second holding member 30 from moving in the short side direction as well as the first holding member 10.

Accordingly, the optical module package 200 is able to be manufactured only by accommodating the fiber unit 9 and the first, second holding members 10, 30 in the housing main body 1 as described above, and then putting the cover body 2 over the housing main body 1. Since it is not necessary to use an adhesive or resin to fix the fiber unit 9 to the housing 1A in the optical module package 200, effort and time required for manufacture can be further reduced.

Further, since the cover body 2 and the housing main body 1 are able to be united together without using an adhesive or resin by fitting the engaging projections 8, 8 of the cover body 2 into the wall locking projections 3, 3, effort and time required for manufacture are able to be further reduced.

Figure 8:
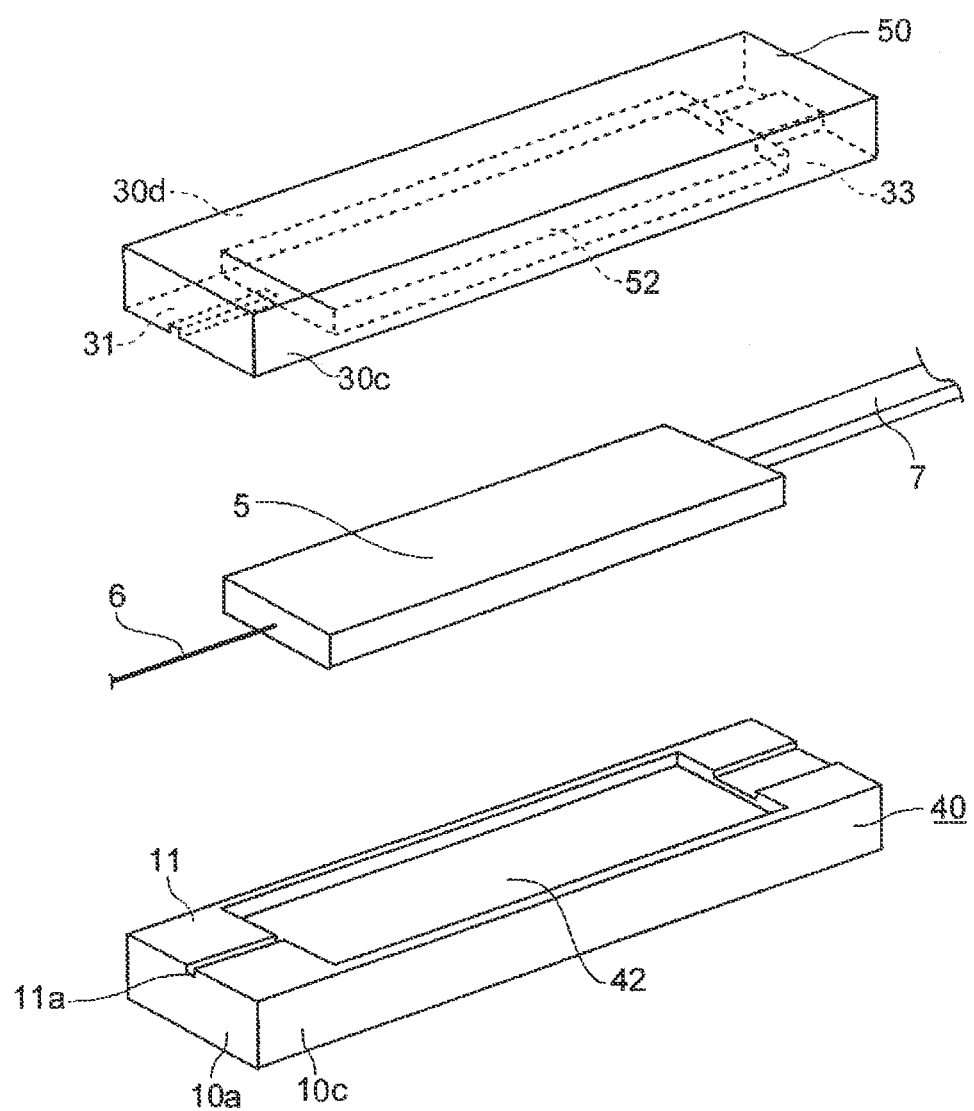
FIG. 8 is an exploded perspective view illustrating the fiber unit and the first holding member and the second holding member according to an exemplary embodiment.

Modified Example of FIG. 8

The first, second holding members 40, 50 according to a modified example will now be explained with reference to FIG. 8. The first, second holding members 40, 50 are different in that they have device receiving parts 42, 52 in place of device receiving parts 12, 32, as compared with the first, second holding members 10, 30.

The device receiving parts 42, 52 are different in that they are recess (e.g., concave) parts into which the optical waveguide device 5 is fitted, as compared with the device receiving parts 12, 32. The device receiving parts 42, 52 come into contact with the optical waveguide device 5 not only in the long side direction but also in the short side direction to lock the optical waveguide device 5 both in the long side direction and the short side direction. Therefore, the first, second holding members 40, 50 are able to be used to more surely restrict the movement of the optical waveguide device 5 so as to be able to more surely hold the fiber unit 9.

Further, in the above description, one wall locking projection 3 locks both of the first, second holding members 10, 30 as illustrated in FIG. 4. In contrast, two wall locking projections 3 may be formed along a height direction, though not illustrated, so that the wall locking projections 3 lock the first holding member 10 and the second holding member 30 respectively. This improves the strength of the housing 1A that holes the first, second holding members 10, 30.

Further, the interval L4 between the bottom locking projections 4, 4 may be made larger than the arrangement interval L10 of the first holding member 10. This creates a small gap between the bottom locking projections 4, 4 and the first holding member 10, thereby making it possible to absorb an increase in dimension of the first holding member 10 accompanying its thermal expansion.

Furthermore, the housing main body 1 and the cover body 2 have the wall locking projections 3 and the engaging projections 8 respectively. The housing main body 1 and the cover body 2 may have locking holes and engaging claws such as later-described locking holes 153 and engaging claws 158, instead of having the wall locking projections 3 and the engaging projections 8.

Second Embodiment

Structures of the Optical Module Package

Figure 9:
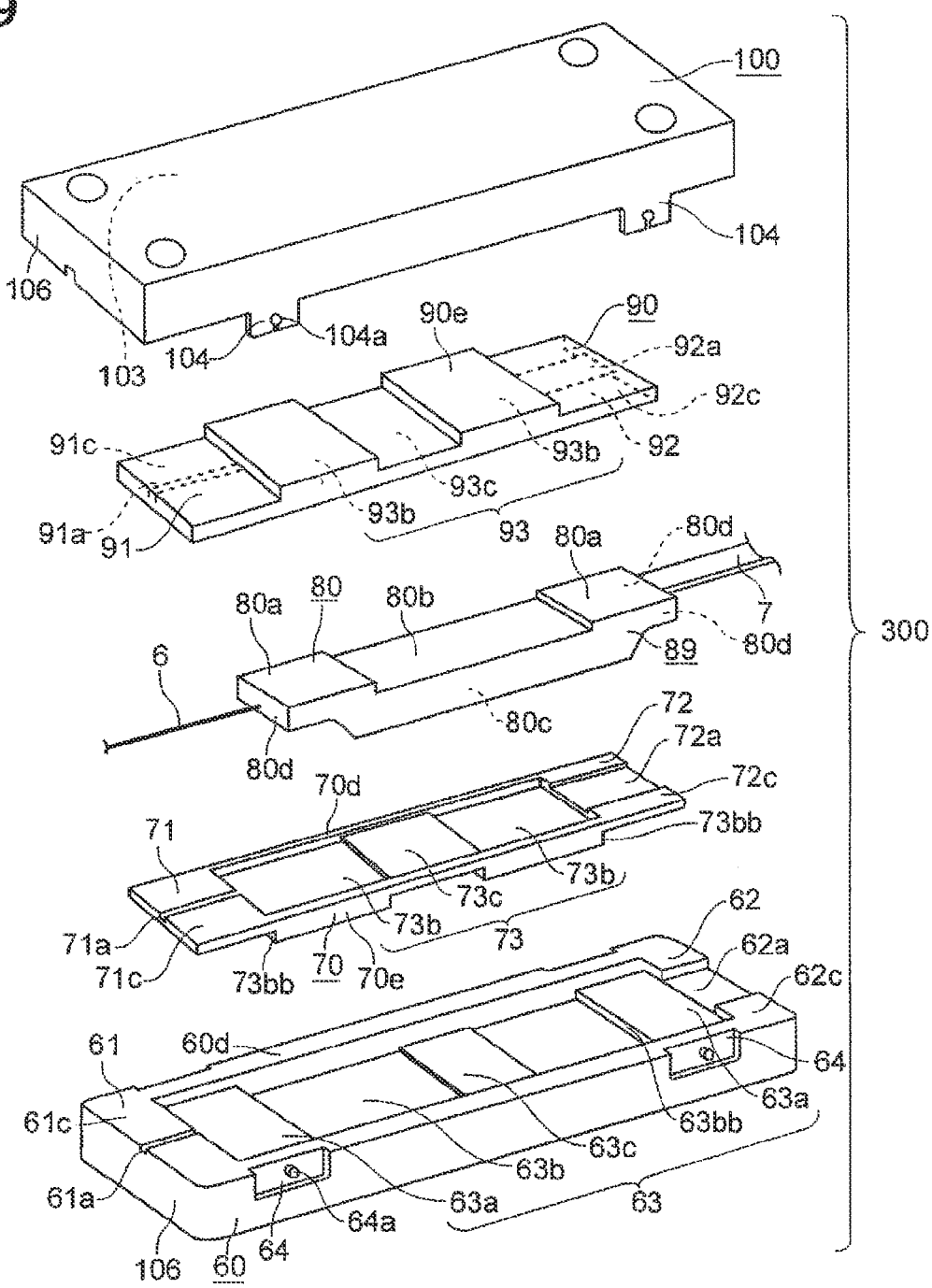
FIG. 9 is an exploded perspective view illustrating the optical module package according to a second embodiment of the present disclosure.
Figure 10:
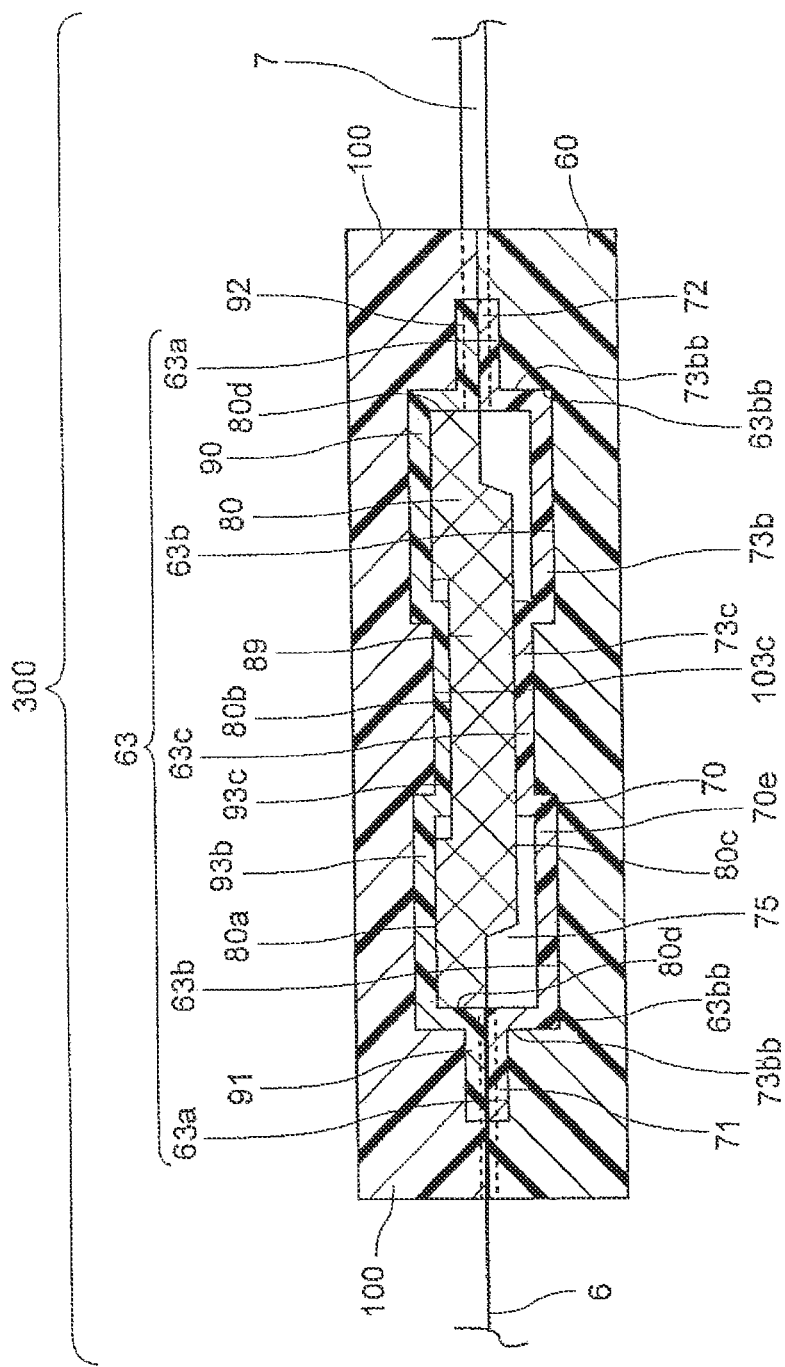
FIG. 10 is a sectional view illustrating the optical module package in FIG. 9, which is cut along the long side direction at the center of a short side direction.
Figure 11:
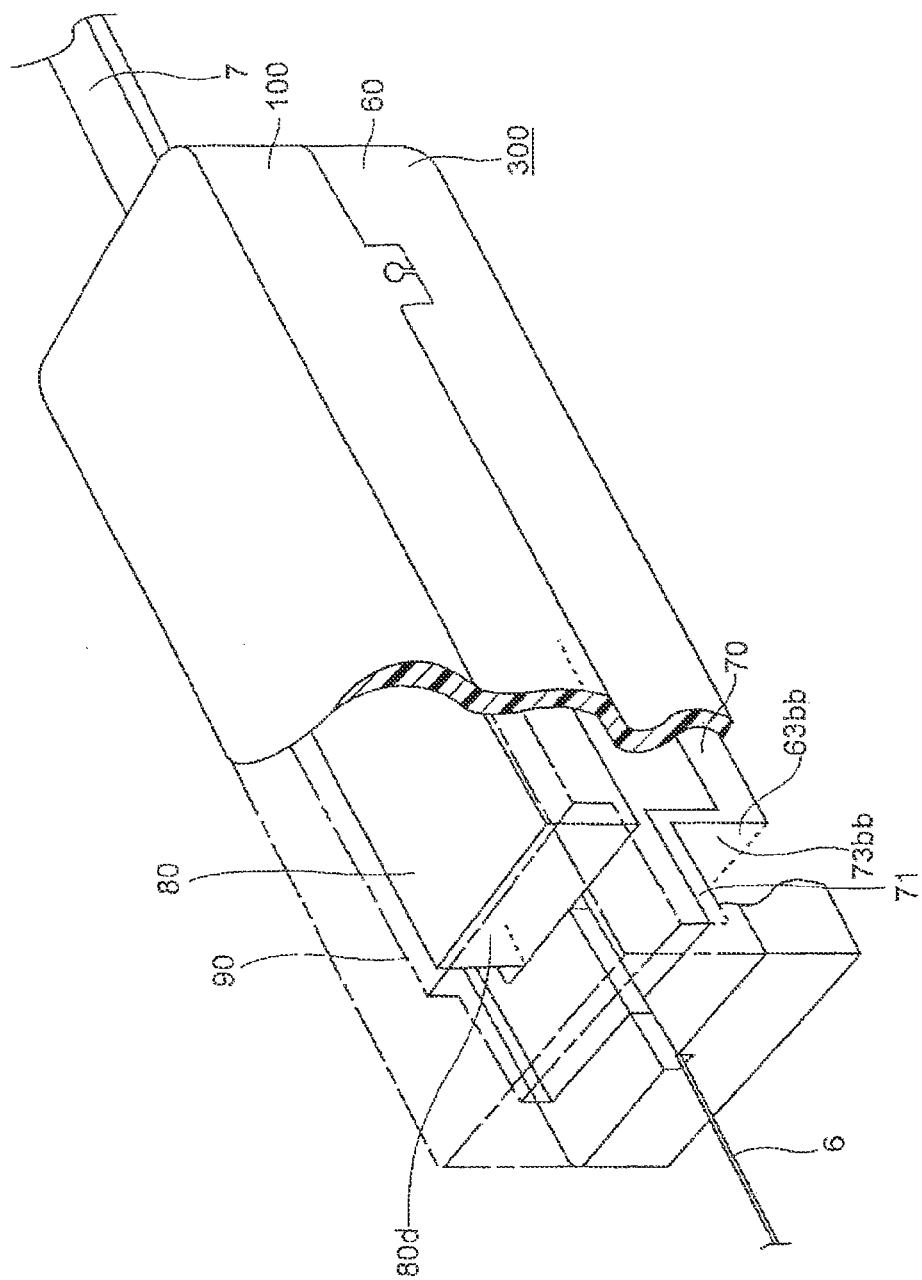
FIG. 11 is a perspective view illustrating the optical module package, which is partially broken and omitted.

The structure of an optical module package 300 according to the second embodiment of the present disclosure will be explained with reference to FIG. 9 to FIG. 11. FIG. 9 is an exploded perspective view illustrating the optical module package 300 according to the second embodiment. FIG. 10 is a sectional view illustrating the optical module package 300, which is cut along the long side direction at the center of short side direction. FIG. 11 is a perspective view illustrating the optical module package 300, which is partially broken and omitted.

The optical module package 300 includes a housing 106 having the housing main body 60 and the cover body 100, the fiber unit 89, the first holding member 70 and the second holding member 90.

In the optical module package 300, two long side inner wall parts 63bb, 63bb of the housing main body 60 lock long side end faces 73bb, 73bb of the first holding member 70 to restrict the movement of the first holding member 70. This allows for manufacture of the optical module package 300 without using an adhesive or resin to fix the fiber unit 89 to the housing 106 nor inserting the optical fiber into a tubular member, resulting in reduction in effort and time required for manufacture.

The housing main body 60 is made of metal or plastic and has a structure in which an accommodating recess (e.g., concave) part 63 is formed on the front side of a tub-like shaped body. The housing main body 60 has two flat end parts 61, 62 having flat surfaces on both sides in the long side direction, and a portion between them is the accommodating recess part 63 which is concave as compared with the flat end parts 61, 62 and surrounded by the flat end parts 61, 62 and a peripheral wall part 60d.

The flat end part 61 has a narrow groove-shaped fiber receiving part 61a formed in a surface 61c thereof. The fiber receiving part 61a is formed in a shape according to the outer shape of an optical fiber member 6. The flat end part 62 has a wide groove-shaped fiber receiving part 62a formed in a surface 62c thereof. The fiber receiving part 62a is formed in a shape according to the outer shape of a tape-shaped optical fiber member 7.

The accommodating recess part 63 has a deep bottom part 63b with a large depth and two shallow bottom parts 63a, 63a.

The accommodating recess part 63 has a function as an accommodating space for the first holding member 70.

At the deep bottom part 63b, a locking raised (e.g., convex) part 63c is formed at the middle in the long side direction. The shallow bottom parts 63a, 63a are arranged on both sides of the outside of the deep bottom part 63b, and formed smaller in depth than the deep bottom part 63b. Portions connecting the deep bottom part 63b with the shallow bottom parts 63a, 63a are steep steps, so that the accommodating recess part 63 has a stepped structure including the steps. Further, the long side inner wall parts 63bb, 63bb arranged separated (e.g., distanced) along the long side direction of the housing main body 60 of inner wall parts facing the accommodating recess part 63 have a function as locking parts for restricting the movement of the first holding member 70.

Further, the housing main body 60 further includes four main body engaging parts 64 provided with engaging projections 64a.

Next, the first holding member 70 and the second holding member 90 will be explained referring mainly to FIG. 9. The illustrated first holding member 70 and second holding member 90 have a common shape. However, they may have different shapes from each other.

The first, second holding members 70, 90 form a unit accommodating part 75 by later-described device receiving parts 73, 93 in a configuration that surfaces of later-described respective contact end parts 71, 72 and 91, 92 oppose each other in direct contact with each other (this configuration or state is referred also to as a direct opposing state). The unit accommodating part 75 has a shape capable of accommodating the fiber unit 89 locked by device receiving parts 73, 93 as illustrated in FIG. 10.

The first, second holding members 70, 90 are formed using chloroprene rubber or the like used as the industrial rubber packing material, as with the first, second holding members 10, 30.

The first holding member 70 has the two contact end parts 71, 72 on both sides in the long side direction, and a portion between them is a device receiving part 73 which is concave as compared with the contact end parts 71, 72 and surrounded by the contact end parts 71, 72 and a peripheral wall part 70d.

The contact end part 71 has a narrow groove-shaped fiber receiving part 71a formed in a surface 71c thereof. The fiber receiving part 71a is formed in a shape according to the outer shape of the optical fiber member 6. The contact end part 72 has a wide groove-shaped fiber receiving part 72a formed in a surface 72c thereof. The fiber receiving part 72a is formed in a shape according to the outer shape of the tape-shaped optical fiber member 7.

The device receiving part 73 has a shape according to the outer dimension of an optical waveguide device 80 (more specifically, common in dimension in the long side direction but approximately half in thickness). The device receiving part 73 has bottom parts 73b and a locking raised (e.g., convex) part 73c arranged at the middle in the long side direction.

Further, the rear face side of the device receiving part 73 is a stepped raised (e.g., convex) part 70e. Faces of the stepped raised part 70e distanced along the long side direction are the long side end faces 73bb, 73bb. The stepped raised part 70e is fitted in the accommodating recess part 63 and has a shape according to the stepped structure of the accommodating recess part 63. Further, the arrangement interval between the long side end faces 73bb and 73bb corresponds to the arrangement interval between the long side inner wall parts 63bb and 63bb, and the shape of each of the long side end faces 73bb corresponds to the shape of the long side inner wall part 63bb.

The second holding member 90 has the two contact end parts 91, 92 on both sides in the long side direction, and a portion between them is a device receiving part 93 which is concave as compared with the contact end parts 91, 92. The contact end part 91 has a fiber receiving part 91a, similar to the fiber receiving part 71a, formed in a surface 91c thereof. The contact end part 92 has a fiber receiving part 92a, similar to the fiber receiving part 72a, formed in a surface 92c thereof. The device receiving part 93 has a shape in common with the device receiving part 73 and has a stepped raised (e.g., convex) part 90e according to the stepped raised part 70e.

The above-described first, second holding members 70, 90 are able to be made to oppose each other with the surfaces of the contact end part 71 and contact end part 91 in direct contact with each other and the surfaces of the contact end part 72 and contact end part 92 in direct contact with each other. Then, a space in which the fiber receiving parts 71a, 91a, the device receiving parts 73, 93, and the fiber receiving parts 72a, 92a are united together is formed inside the first, second holding members 70, 90 as illustrated in detail in FIG. 10. This space is the unit accommodating part 75.

The fiber receiving parts 71a, 91a have a shape according to the optical fiber member 6, and the fiber receiving part 72a, 92a have a shape according to the tape-shaped optical fiber member 7. Further, the device receiving parts 73, 93 have a shape according to the outer dimension of the optical waveguide device 80. Therefore, the unit accommodating part 75 composed of them has a shape capable of accommodating the fiber unit 89 locked by the device receiving parts 73, 93.

The fiber unit 89 is constituted such that the optical fiber member 6 and the tape-shaped optical fiber member 7 are connected to the optical waveguide device 80 which are united together as illustrated in FIG. 9. The optical waveguide device 80 is different in shape but similar in the other, as compared with the optical waveguide device 5.

The optical waveguide device 80 has a recess (e.g., concave) part 80b formed between flat end parts 80a and 80a. When the fiber unit 89 is accommodated in the unit accommodating part 75, contact end parts 80d, 80d in the long side direction of the flat end parts 80a, 80a come into contact with the device receiving part 93, whereby the movement of the fiber unit 89 in the long side direction is restricted by the device receiving part 93. Further, the movement of the fiber unit 89 in the short side direction is also restricted by the device receiving part 93. Furthermore, since the recess part 80b and a raised (e.g., convex) part 80c on the rear side come into contact with the locking raised parts 93c, 73c respectively, the movement of the optical waveguide device 80 in the vertical direction is also restricted by the device receiving parts 73, 93.

The cover body 100 is different in that it has cover engaging parts 104 provided with engaging holes 104a in place of the main body engaging parts 64, as compared with the housing main body 60, but it is a tub-like shaped body having the same structure as that of the housing main body 60 in the other. Incidentally, the cover body 100 may be formed in a different shape from that of the housing main body 60 by changing the shape on the front side.

The cover body 100 is formed with an accommodating recess (e.g., concave) part 103 similar to the accommodating recess part 63. The accommodating recess part 103 is formed with a locking raised part 103c similar to the locking raised part 63c. The accommodating recess part 103 has a shape into which the stepped raised part 90e is fitted. Further, the cover body 100 is formed with not-illustrated fiber receiving parts similar to the fiber receiving parts 61*a*, 62*a* and has long side inner wall parts similar to the long side inner wall parts 63*bb*, 63*bb*.

Operation and Effect of Optical Module Package 300

As described above, in the optical module package 300, the fiber unit 89 is held sandwiched between the first and second holding members 70 and 90 as illustrated in FIG. 10, and accommodated in the housing main body 106 (the housing main body 60 and the cover body 100) in that state.

The housing main body 60 and the cover body 100 have the fiber receiving parts 61*a*, 62*a* and the not-illustrated fiber receiving parts similar to them respectively on both sides in the length direction of the accommodating recess parts 63, 103. Therefore, in the optical module package 300, the fiber unit 89 can be accommodated in the housing 106 while the optical fiber member 6 are kept extending along the axial core direction without being bent. Consequently, also in the optical module package 300, when the fiber unit 89 is accommodated in the housing main body 106, it is unnecessary to insert the optical fiber member 6 into a tubular member, as in the optical module package 200, thus making it possible to reduce the effort and time required for manufacture.

Further, since the fiber unit 89 is accommodated in a configuration that the first, second holding members 70, 90 hold the fiber unit 89, the movement of the fiber unit 89 is restricted by the first, second holding members 70, 90.

In addition, the long side inner wall parts 63*bb*, 63*bb* of the housing main body 60 are in contact with the long side end faces 73*bb*, 73*bb* of the first holding member 70 to lock them. The not-illustrated long side inner wall parts of the cover body 100 are also in contact with long side end faces of the second holding member 90 similar to the long side end faces 73*bb* to lock them. Therefore, not only the first, second holding members 70, 90 are able to restrict the movement of the optical waveguide device 80, but also the housing 106 is able to restrict the movement of the first, second holding members 70, 90 so as to prevent the first, second holding members 70, 90 from moving in the long side direction.

Further, the stepped raised part 70*e* is fitted in the accommodating recess part 63, and the stepped raised part 90*e* of the second holding member 90 is fitted in the accommodating recess part 103 of the cover body 100. Further, the contact end parts 71, 72 are fitted into the shallow bottom parts 63*a*, 63*a* with no gap therebetween, and the contact end parts 91, 92 are similarly fitted into not-illustrated shallow bottom parts of the cover body 100 with no gap therebetween. Therefore, the movement of the first, second holding members 70, 90 in the short side direction is also restricted by the housing 106.

Accordingly, the optical module package 300 is able to be manufactured by accommodating the first holding member 70 in the housing main body 60, then accommodating the fiber unit 89 in the first holding member 70, putting the second holding member 90 over the fiber unit 89 from the upper side, and finally putting the cover body 100 over the second holding member 90 and attaching the cover body 100 to the housing main body 60. Consequently, since it is not necessary to use an adhesive or resin to fix the fiber unit 89 to the housing 106 also in the optical module package 300, as in the optical module package 200, effort and time required for manufacture can be further reduced.

Further, since the cover body 100 and the housing main body 60 can be united together without using an adhesive or resin by engaging the cover engaging parts 104 of the cover body 100 with the main body engaging parts 64, effort and time required for manufacture can be further reduced.

Modified Example of the Second Embodiment

Figure 12:
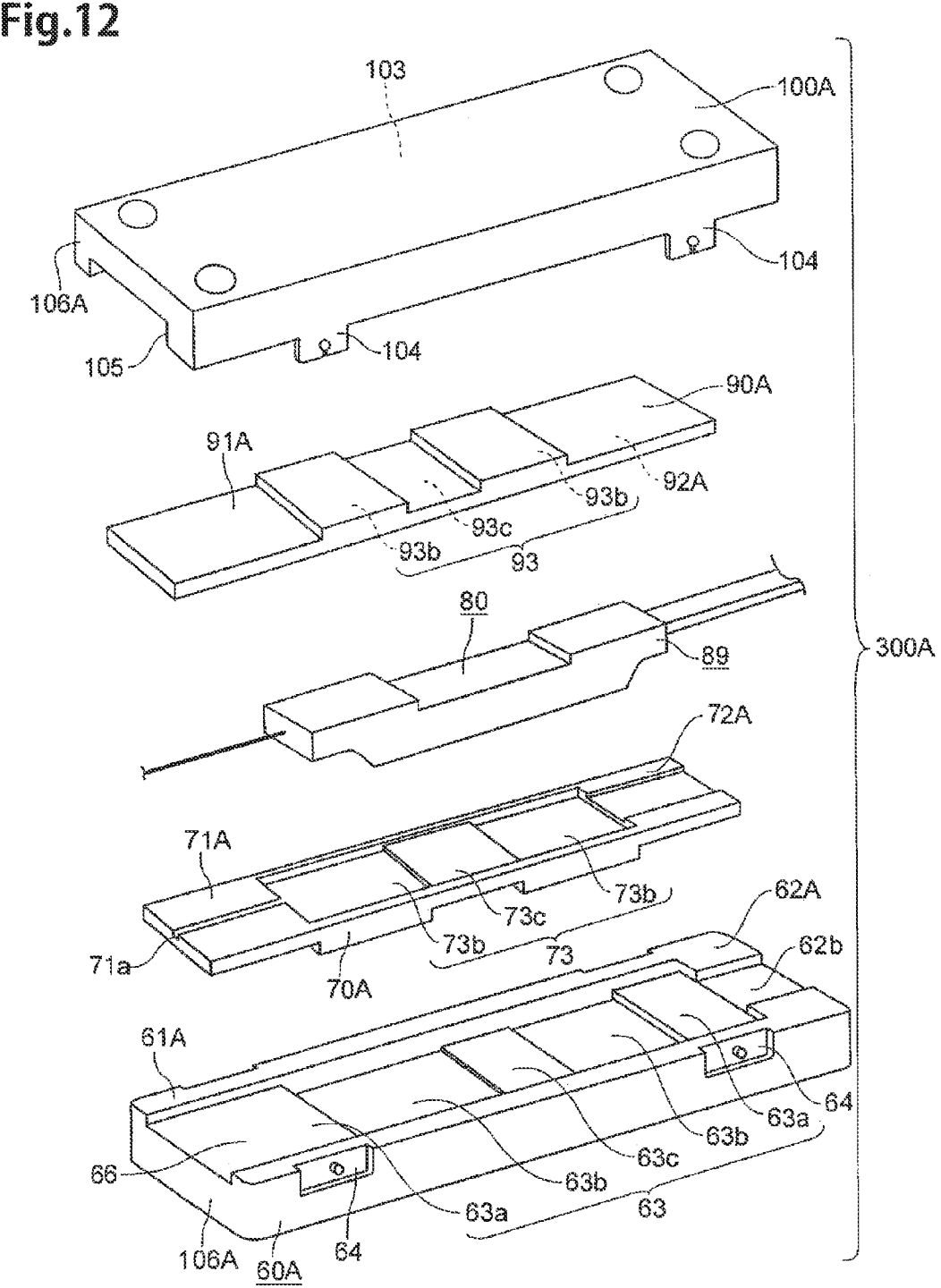
FIG. 12 is an exploded perspective view illustrating the optical module package according to an exemplary embodiment.
Figure 13:
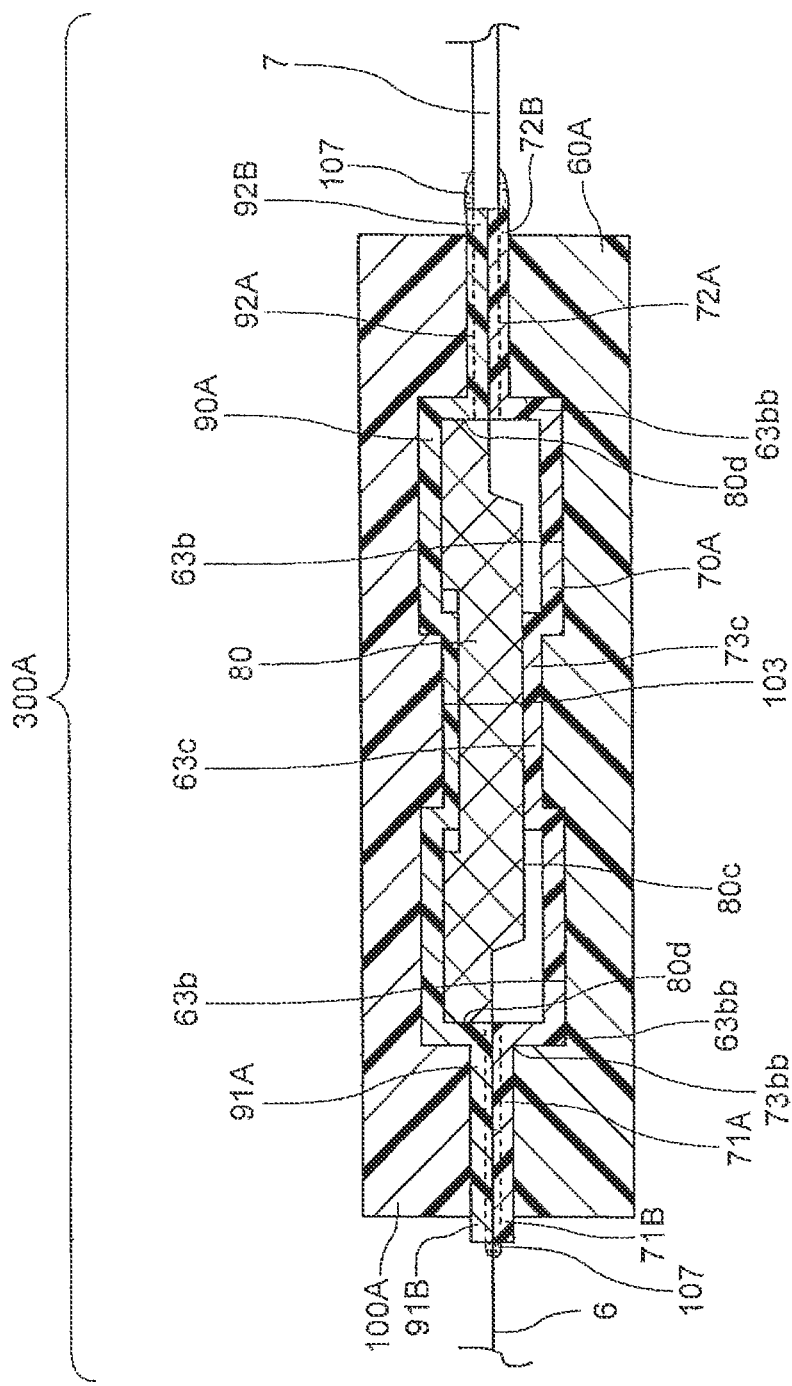
FIG. 13 is a sectional view illustrating the optical module package in FIG. 12, which is cut along the long side direction at the center of short side direction.
Figure 14:
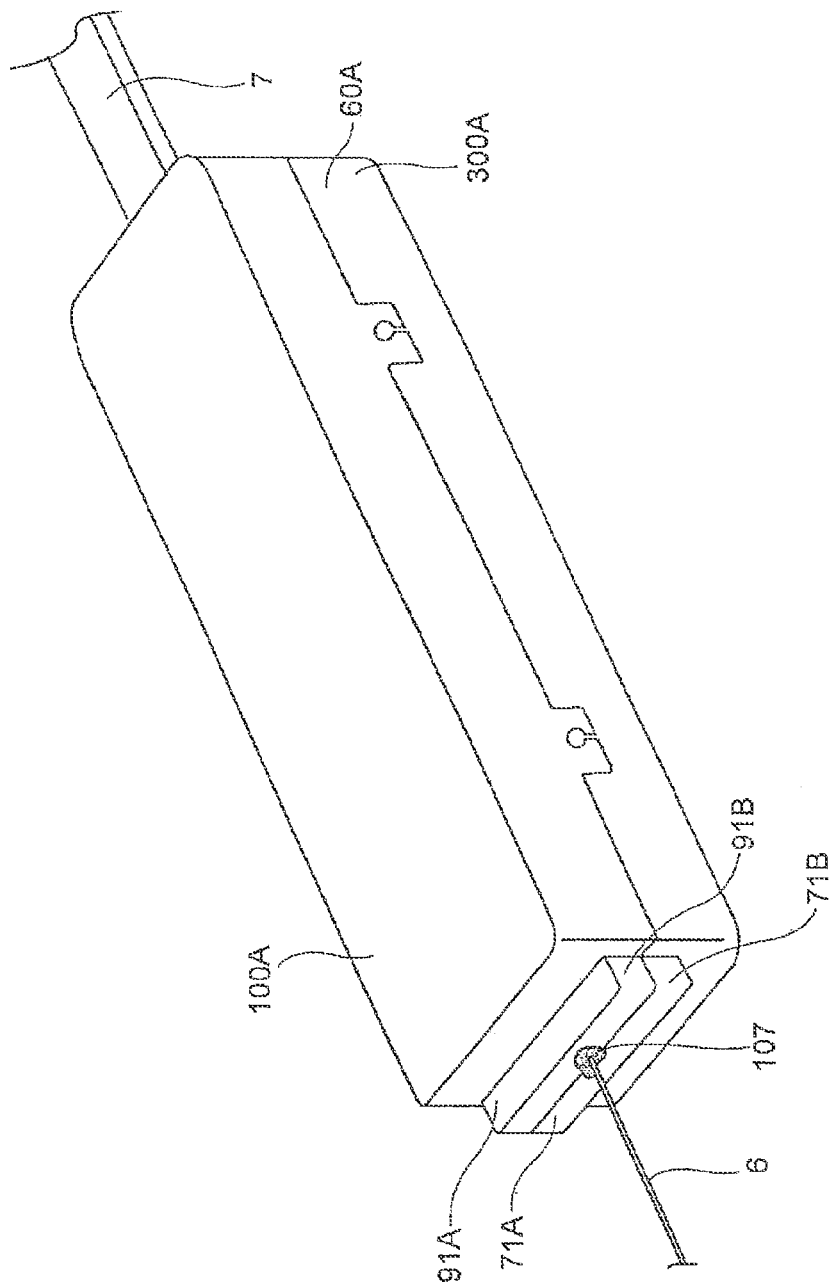
FIG. 14 is a perspective view illustrating the optical module package in FIG. 12.

An optical module package 300A according to a modified example will now be explained with reference to FIG. 12 to FIG. 14. The optical module package 300A is different in that package 300A has a housing 106A, the first, second holding members 70A, 90A in place of the housing 106, the first, second holding members 70, 90, as compared with the optical module package 300.

The housing 106A has a housing main body 60A and a cover body 100A. The housing main body 60A is different in that it has flat end parts 61A, 62A in place of the flat end parts 61, 62, as compared with the housing main body 60. The flat end parts 61A, 62A are different in that they have fiber receiving parts 66, 62*b* in place of the fiber receiving parts 61*a*, 62*a* and are long in the long side direction, as compared with the flat end parts 61, 62. The fiber receiving part 66 is wider than the fiber receiving part 61*a*. The fiber receiving part 66 is connected to a shallow bottom part 63*a* and formed with the same width as that of the shallow bottom part 63*a*. The fiber receiving part 62*b* is longer in the long side direction than the fiber receiving part 62*a*.

The first holding member 70A is different in that it has contact end parts 71A, 72A in place of the contact end parts 71, 72, as compared with the first holding member 70. The contact end parts 71A, 72A are long in the long side direction than the contact end parts 71, 72. The contact end part 71A is engaged with one shallow bottom part 63*a* and the fiber receiving part 66, and has an end part projecting from the fiber receiving part 66. The contact end part 72A is engaged with another shallow bottom part 63*a* and the fiber receiving part 62*b*, and has an end part projecting from the fiber receiving part 62*b*. Further, the interval between both end parts of the contact end parts 71A and 72A is longer than the length of the housing 60A in the long side direction.

The first holding member 90A is different in that it has contact end parts 91A, 92A in place of the contact end parts 91, 92, as compared with the first holding member 90. The contact end parts 91A, 92A are longer in the long side direction than the contact end parts 91, 92, and has a structure in common with the contact end parts 71A, 72A.

The cover body 100A is different in that it has a fiber receiving part 105 according to the fiber receiving part 66, as compared with the cover body 100.

Also in the optical module package 300A, as in the optical module package 300, the fiber unit 89 is held sandwiched between the first and second holding members 70A and 90A, and accommodated in the housing 106A in that state.

The interval between both end parts of the contact end parts 71A and 72A is longer than the length of the housing main body 60A in the long side direction. Therefore, when the first, second holding members 70A, 90A are accommodated in the housing main body 60A and the cover body 100A is put over the housing main body 60A, edge parts of the contact end parts 71A, 91A, 72A, 92A protrude outward from the housing main body 60A and the cover body 100A as illustrated in FIG. 13, FIG. 14 to form protruding edge parts 71B, 91B, 72B, 92B. In the optical module package 300A, the optical fiber member 6 and the tape-shaped optical fiber member 7 are fixed to the protruding edge parts 71B, 91B, 72B, 92B using an adhesive 107.

Since it is not necessary to use an adhesive or resin to fix the fiber unit 89 to the housing 106A in the optical module package 300A, effort and time required for manufacture can be further reduced.

In addition, since the optical fiber member 6 are fixed to the protruding edge part 71B in the optical module package 300A, the optical fiber member 6 are unlikely to come into contact with the housing 106A when the optical fiber member 6 are bent. Further, the possibility that the optical fiber member 6 enter the gap between the first and second holding members 70A and 90A is eliminated.

Note that holding members with parts of side surface portions are opened like the first, second holding members 10, 30 may be used in place of the first, second holding members 70A, 90A.

Third Embodiment

Structures of the Optical Module Package

Figure 15:
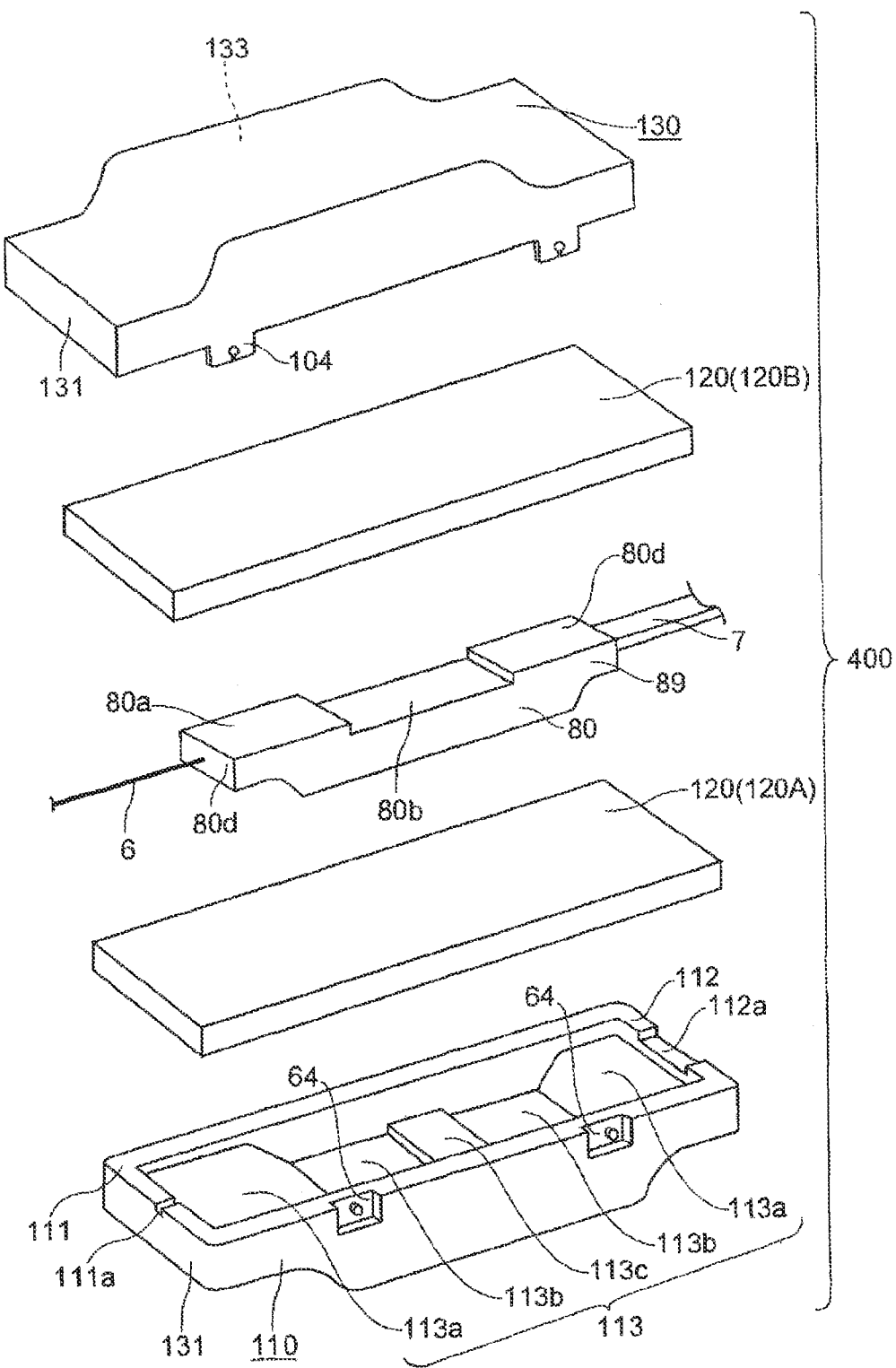
FIG. 15 is an exploded perspective view illustrating the optical module package according to a third embodiment.
Figure 16:
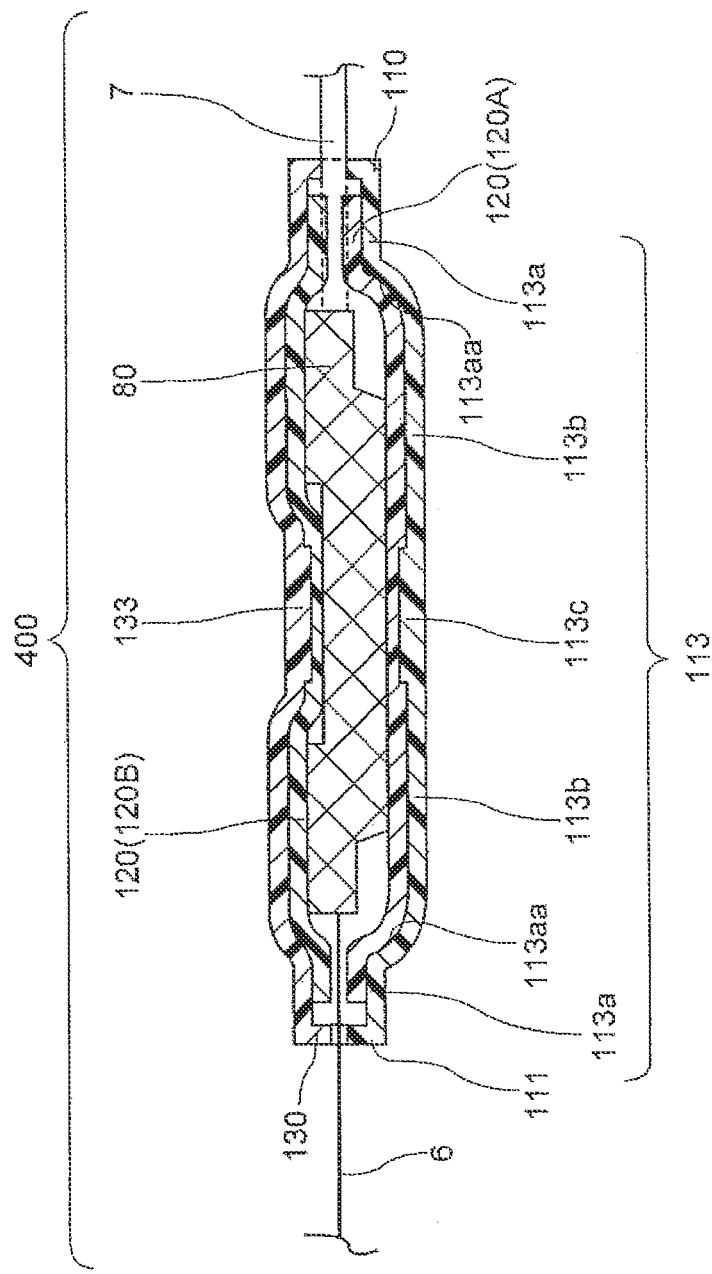
FIG. 16 is a sectional view illustrating the optical module package in FIG. 15, which is cut along the long side direction at the center of a short side direction.
Figure 17:
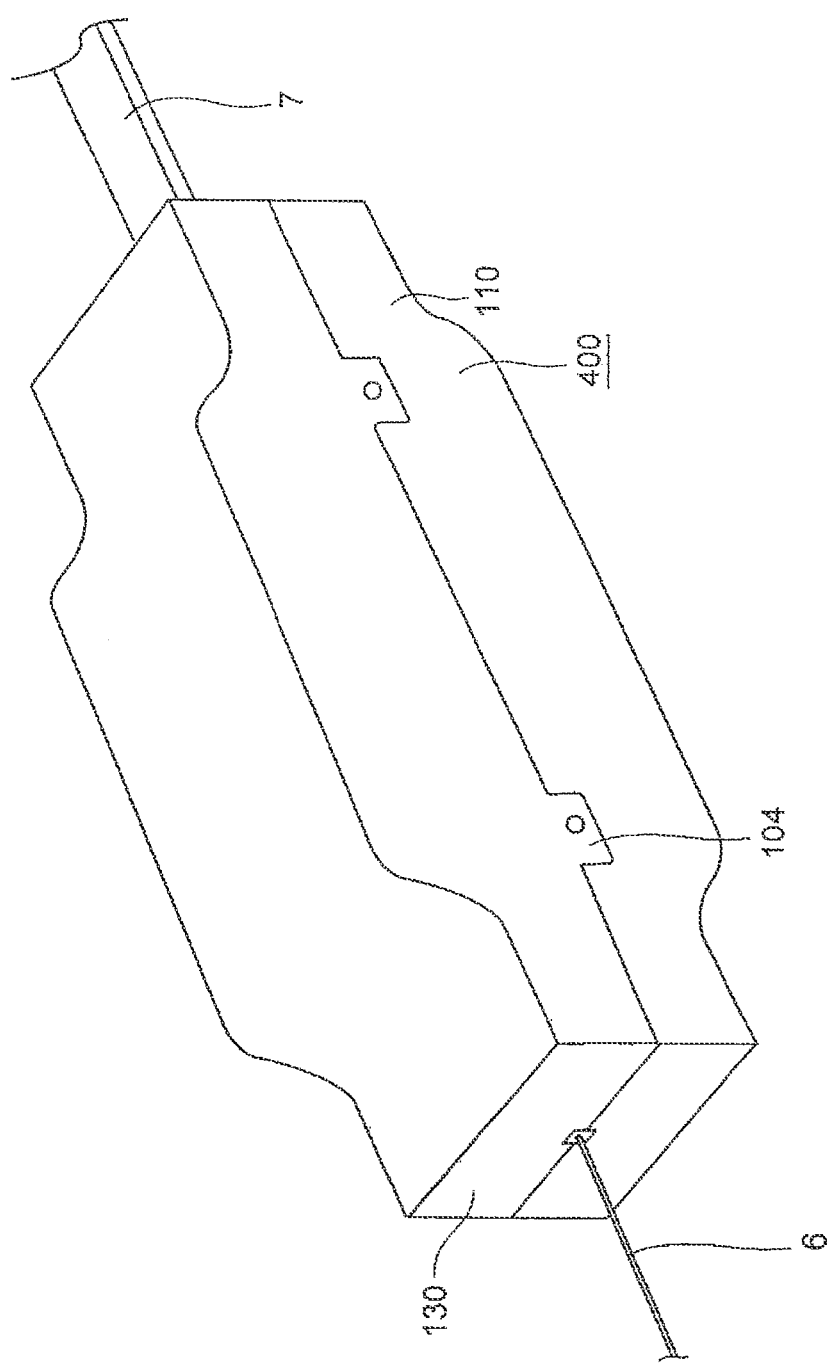
FIG. 17 is a perspective view illustrating the optical module package in FIG. 15.

To begin with, the structure of an optical module package 400 according to the third embodiment will be explained with reference to FIG. 15 to FIG. 17. FIG. 15 is an exploded perspective view illustrating the optical module package 400 according to the third embodiment of the present invention. FIG. 16 is a sectional view illustrating the optical module package 400, which is cut along the long side direction at the center of short side direction. FIG. 17 is a perspective view illustrating the optical module package 400.

The optical module package 400 includes a housing 131 having a housing main body 110 and a cover body 130, the fiber unit 89, the first, second holding members 120 (120A, 120B).

In the optical module package 400, two inward inclined parts 113*aa*, 113*aa* of the housing main body 110 lock the first holding member 120A to restrict the movement of the first holding member 120A. Thus, the optical module package 400 can be manufactured without using an adhesive or resin to fix the fiber unit 89 to the housing 131 nor inserting the optical fiber into a tubular member, resulting in reduction in effort and time required for manufacture.

The housing main body 110 is different in that an accommodating recess (e.g., concave) part 113 is formed in place of the accommodating recess part 63 and in that flat end parts 111, 112 are formed in place of the flat end parts 61, 62, as compared with the housing main body 60.

The accommodating recess part 113 is different, as compared with the accommodating recess part 63, in that accommodating recess part 113 has shallow bottom parts 113*a*, 113*a*, a deep bottom part 113*b*, and a locking raised part 113*c* in place of the shallow bottom parts 63*a*, 63*a*, the deep bottom part 63*b*, and the locking raised part 63*c*. The shallow bottom part 113*a* is different in that a portion connecting to the deep bottom part 113*b* is the inward inclined part 113*aa*, as compared with the shallow bottom parts 63*a*. The inward inclined part 113*aa* is not the step like the accommodating recess part 63*a* but is an inclined surface linking the shallow bottom part 113*a* and the deep bottom part 113*b* in a gradual descending slope shape. The deep bottom part 113*b* and the locking raised part 113*c* are similar to the deep bottom part 63*b* and the locking raised part 63*c* respectively.

The flat end parts 111, 112, as compared with the flat end parts 61, 62 respectively, are different in that they are short in length in the long side direction and have fiber receiving parts 111*a*, 112*a*. The fiber receiving parts 111*a*, 112*a* are different in that they are short in length, as compared with the fiber receiving parts 61*a*, 62*a* respectively.

The cover body 130 is different in that it has cover engaging parts 104 in place of the main body engaging parts 64 but has a common structure in the other, as compared with the housing main body 110. The cover body 130 has an accommodating recess part (e.g., concave) 133 similar to the accommodating recess part 113. Note that the cover body 130 may be formed in a different shape from that of the housing main body 110 by changing the shape of its surface.

The first, second holding members 120A, 120B are formed using soft members with rubber elasticity such as chloroprene rubber or the like used as the industrial rubber packing material, as with the first, second holding members 70, 90.

The first, second holding members 120A, 120B are formed in a plate shape as illustrated in the drawing. As described above, the first, second holding members 70, 90 have shapes according to the housing main body 60 and the cover body 100 respectively. In contrast, the first, second holding members 120A, 120B are plate-shaped members in a non-external force state without any external force applied thereto, but deform into shapes according to the housing main body 110 and the cover body 130 respectively.

Operation and Effect of Optical Module Package 400

In the optical module package 400, the fiber unit 89 is held sandwiched between the first and second holding members 120A and 120B, and accommodated in the housing 131 (the housing main body 110 and the cover body 130) in that configuration.

Also in the optical module package 400, the fiber unit 89 can be accommodated in the housing main body 110 while the optical fiber member 6 are kept extending along the axial core direction without being bent as in the optical module package 300. Consequently, it is also possible to reduce the effort and time required to manufacture the optical module package 400 as with the optical module package 300.

The first, second holding members 120A, 120B are formed using soft members with rubber elasticity. Therefore, when the first, second holding members 120A, 120B are accommodated in the housing main body 110 while sandwiching the fiber unit 89 therebetween, and the cover body 130 is attached to the housing main body 110, the first, second holding members 120A, 120B come into close contact with the fiber unit 89 while deforming according to the accommodating recess parts 113, 133 respectively.

In this case, the first, second holding members 120A, 120B restrict the movement of the fiber unit 89.

Further, as for the accommodating recess part 113, the inward inclined parts 113*aa* come into contact with the first holding member 120A to lock the first holding member 120A with friction. As for the accommodating recess part 133, the inward inclined parts thereof also come into contact with the second holding member 120B to lock the second holding member 120B with friction. Therefore, the housing 131 is able to also restrict the movement of the first, second holding members 120A, 120B so as to prevent the first, second holding members 120A, 120B from moving in the long side direction.

Further, the first holding member 120A fits into the accommodating recess part 113, whereby the movement of the first holding member 120A in the short side direction is also restricted. Similarly, the second holding member 120B fits into the accommodating recess part 133, whereby the movement of the second holding member 120B in the short side direction is also restricted.

Accordingly, the optical module package 400 is able to be manufactured by accommodating the first holding member 120A in the housing main body 110, then accommodating the fiber unit 89 in the housing main body 110, putting the second holding member 120B over the fiber unit 89, and finally putting the cover body 130 over the second holding member 120B and attaching the cover body 130 to the housing main body 110. Consequently, since it is not necessary to use an adhesive or resin to fix the fiber unit 89 to the housing 131 also in the optical module package 400, as in the optical module package 300, effort and time required for manufacture can be further reduced.

In particular, the optical module package 400 has the plate-shaped first, second holding members 120A, 120B and therefore produces operations and effects different from those of the optical module package 300.

For the above-described optical module package 300, the first, second holding members 70, 90 which are processed in shapes according to the housing 106 need to be prepared in advance.

However, in the optical module package 400, the first, second holding members 120A, 120B are formed in a plate shape and do not need to be previously processed into shapes according to the housing 131. Consequently, effort and time required to manufacture the optical module package 400 and its manufacturing cost can be reduced as compared with the optical module package 300.

Modified Example of the Third Embodiment

Figure 18:
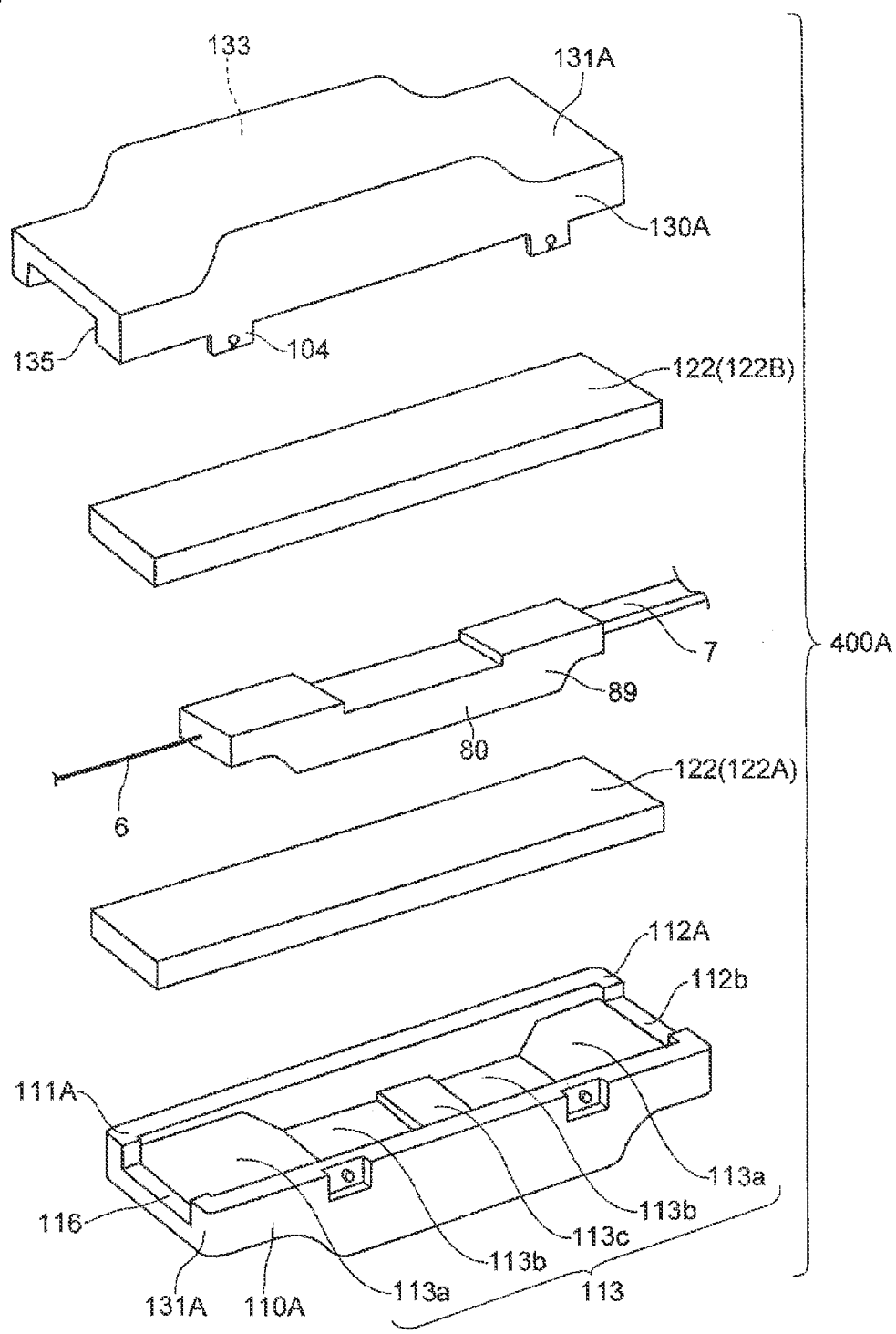
FIG. 18 is an exploded perspective view illustrating the optical module package according to a modified example.
Figure 19:
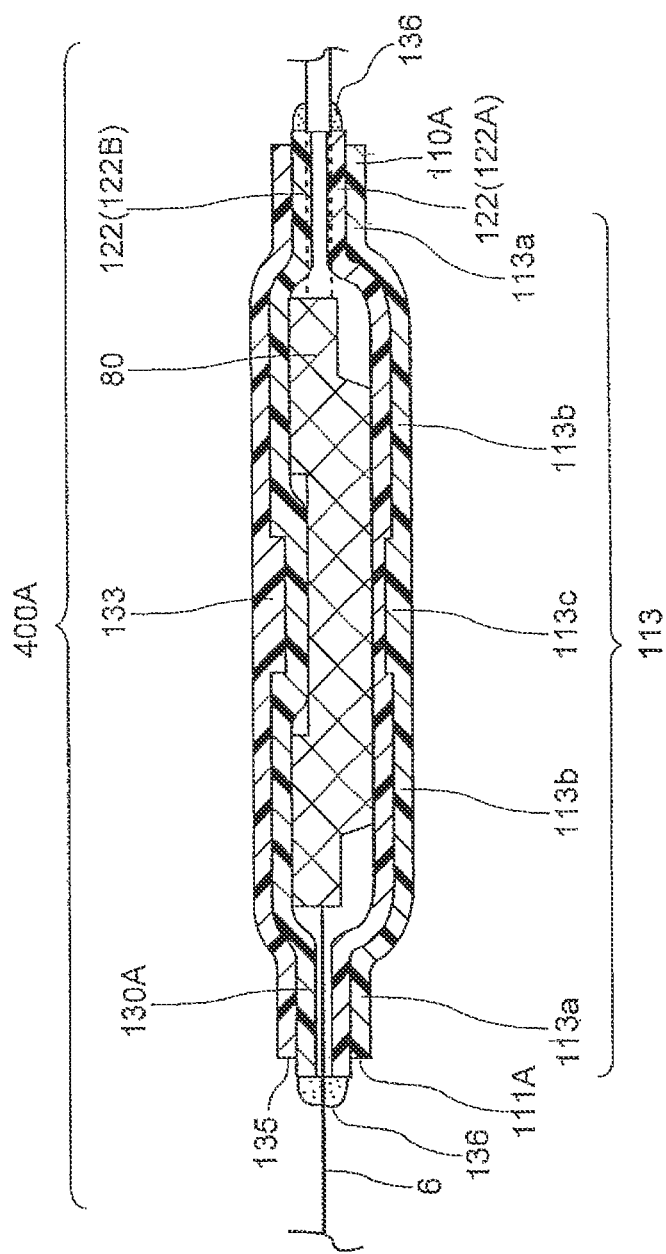
FIG. 19 is a sectional view illustrating the optical module package in FIG. 18, which is cut along the long side direction at the center of short side direction.
Figure 20:
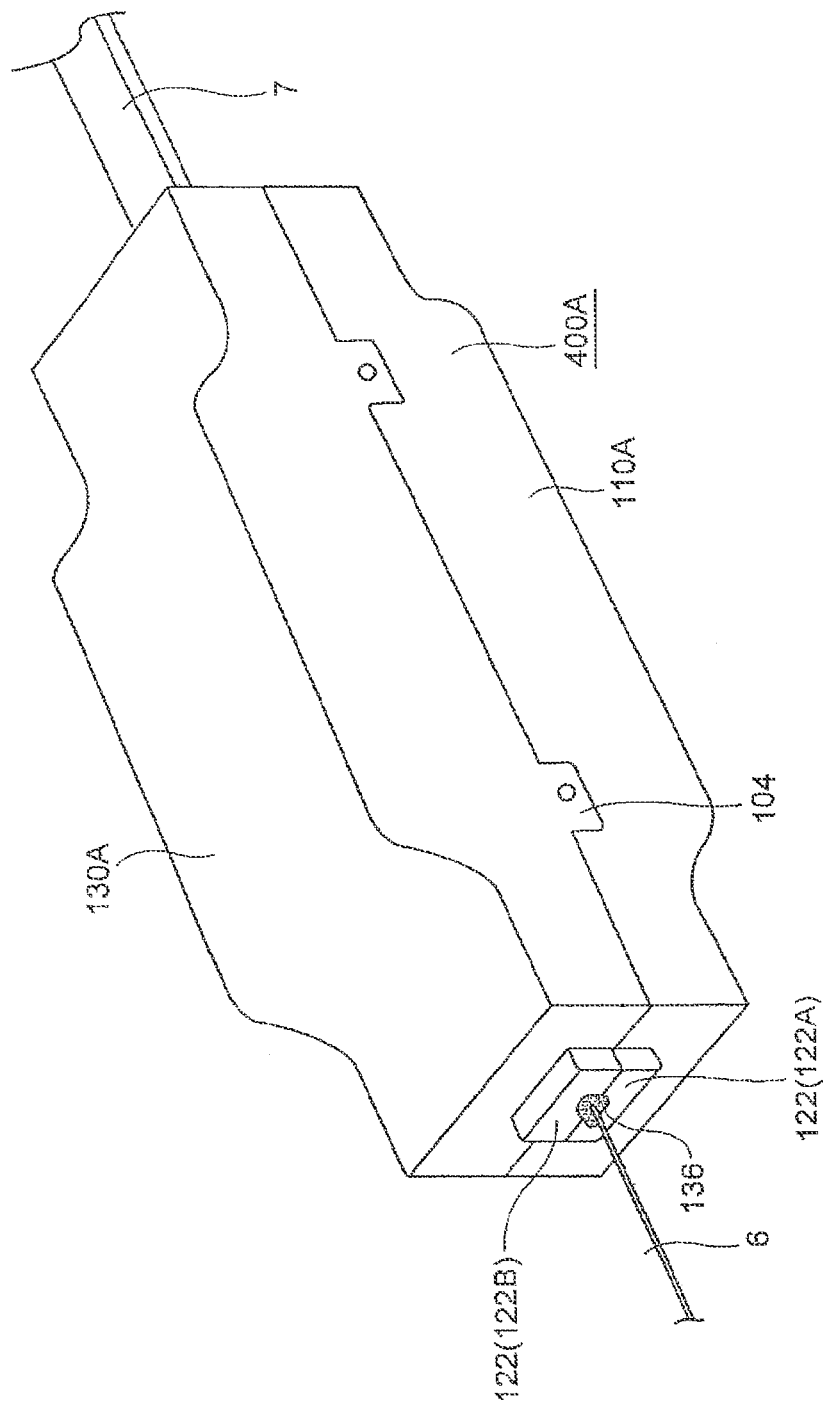
FIG. 20 is a perspective view illustrating the optical module package in FIG. 18.

An optical module package 400A according to a modified example will now be explained with reference to FIG. 18 to FIG. 20. The optical module package 400A is different in that it has a housing main body 110A, the first, second holding members 122A, 122B and a cover body 130A in place of the housing main body 110, the first, second holding members 120A, 120l and the cover body 130, as compared with the optical module package 400.

The housing main body 110A is different in that it has flat end parts 111A, 112A in place of the flat end parts 111, 112, as compared with the housing main body 110. The flat end parts 111A, 112A are different in that they have fiber receiving parts 116, 112b in place of the fiber receiving parts 111a, 112a respectively and are long in the long side direction, as compared with the flat end parts 111, 112. The fiber receiving part 116 is wider than the fiber receiving parts 111a. The fiber receiving part 116 is connected to the shallow bottom part 113a and formed with the same width as that of the shallow bottom part 113a. The fiber receiving part 112b is connected to the shallow bottom part 113a and formed with the same width as that of the shallow bottom part 113a.

The first, second holding members 122A, 12213 are different in that they are long in the long side direction, as compared with the first, second holding members 120A, 120B. The lengths of the first, second holding members 122A, 122B in the long side direction are longer than a housing 131A.

The cover body 130A is different in that it has a fiber receiving part 135 according to the fiber receiving part 116 and is long in the long side direction, as compared with the cover body 130.

Also in the above optical module package 400A, as in the optical module package 400, the fiber unit 89 is held sandwiched between the first and second holding members 122A and 122B, and accommodated in the housing 131A in that state.

Since the lengths of the first, second holding members 122A, 1228 in the long side direction are longer than that of the housing 131A, end parts on both sides in the long side direction of the first, second holding members 122A, 122B protrude from the housing 131A. Therefore, as illustrated in FIG. 19, FIG. 20, the optical fiber member 6 and the tape-shaped optical fiber member 7 are fixed to the protruding edge parts using an adhesive 136.

Since it is not necessary to use an adhesive or resin to fix the fiber unit 89 to the housing 131A also in the optical module package 400A, effort and time required for manufacture can be reduced.

In addition, since the optical fiber member 6 are fixed to the protruding edge parts of the first, second holding members 122A, 122B in the optical module package 400A, the optical fiber member 6 are unlikely to come into contact with the housing 131A when the optical fiber member 6 are bent. Further, the possibility that the optical fiber member 6 enter the gap between the first and second holding members 122A and 122B is eliminated.

Note that in the above-described housing 131, the accommodating recess part 113 has the inward inclined parts 113aa but may have a stepped structure as in the housing 60 in place of the inward inclined parts 113aa.

Fourth Embodiment

Structures of the Optical Module Package

Figure 21:
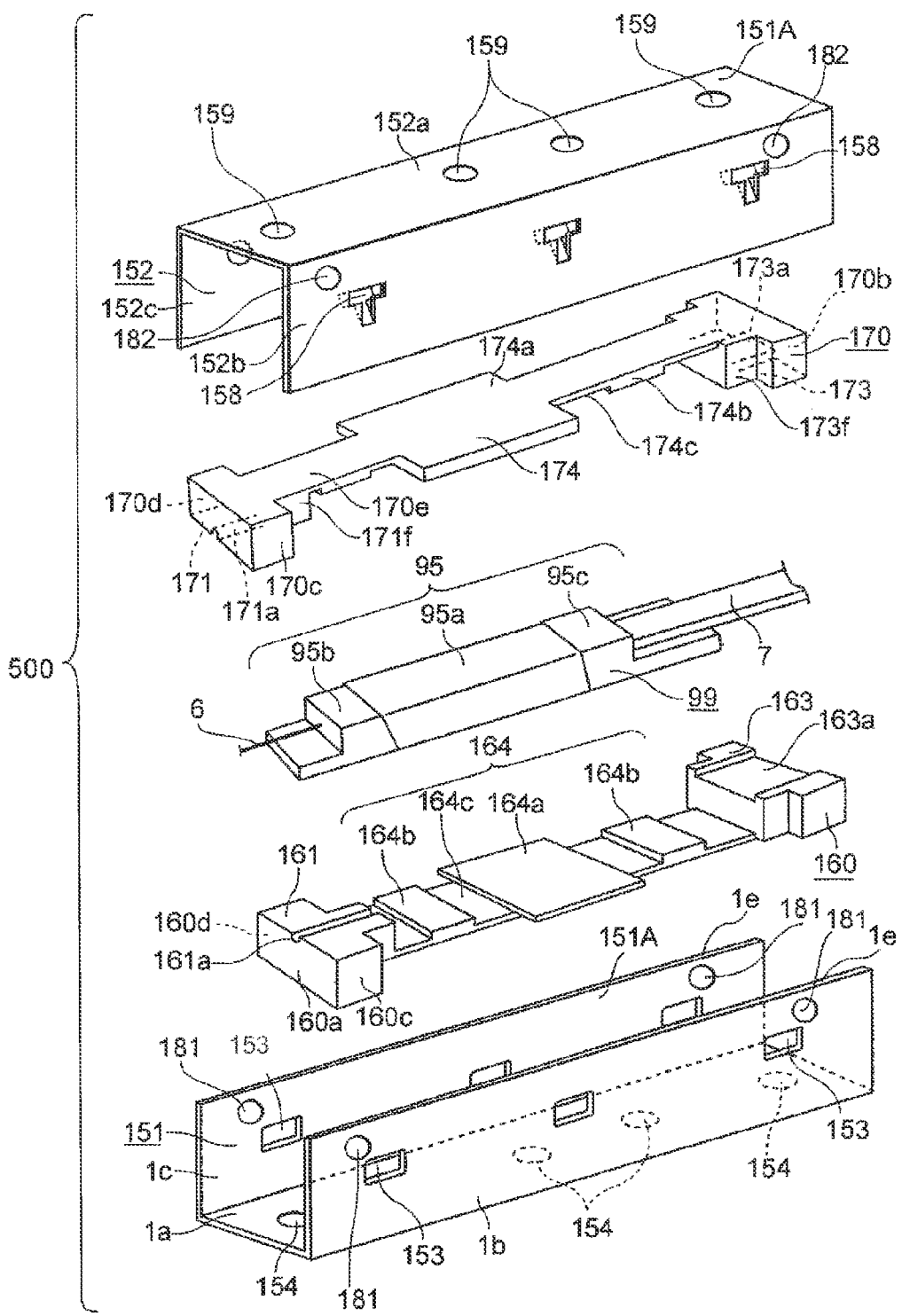
FIG. 21 is an exploded perspective view illustrating the optical module package according to a forth embodiment.
Figure 22:
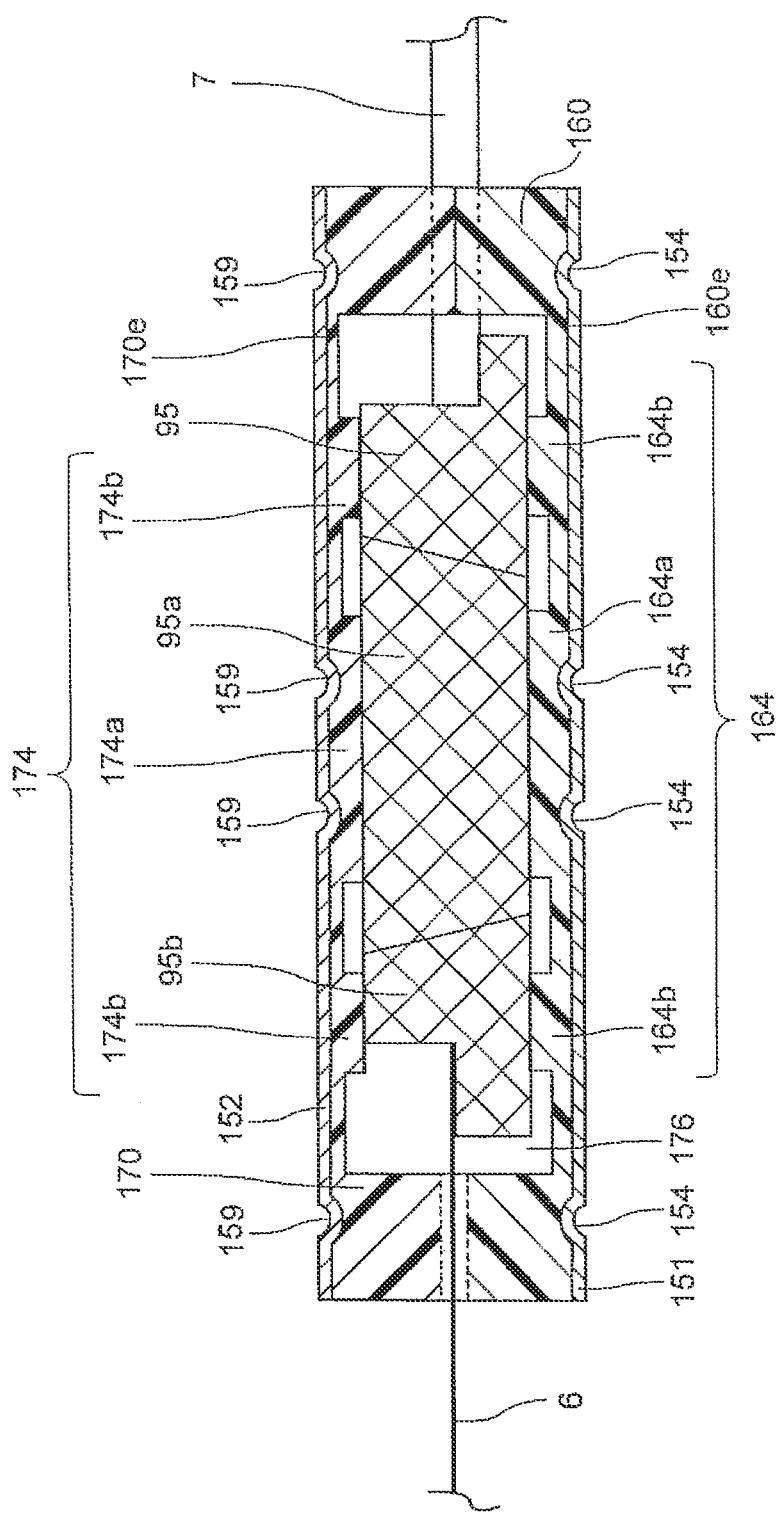
FIG. 22 is a sectional view illustrating the optical module package in FIG. 21, which is cut along the long side direction at the center of short side direction.
Figure 23:
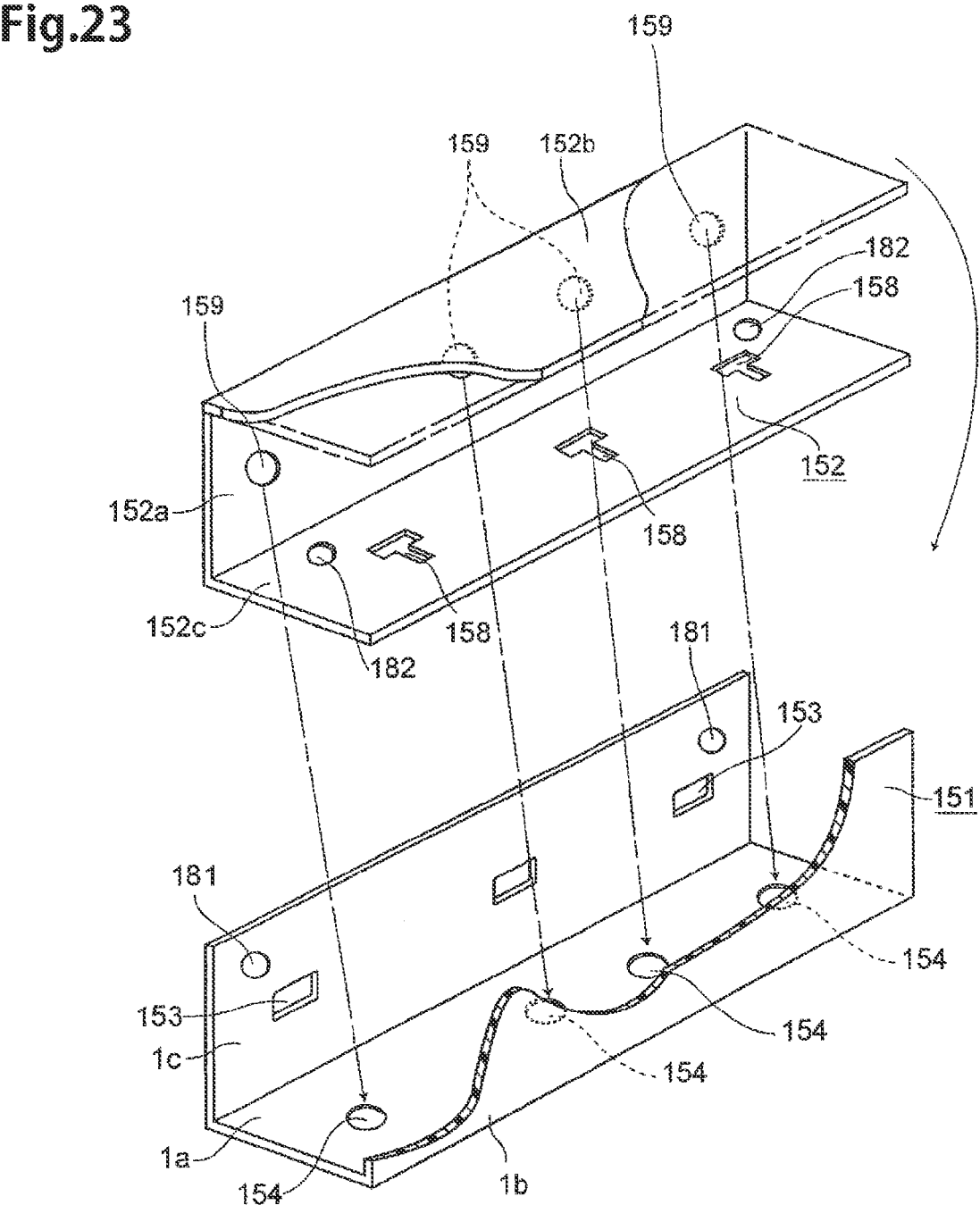
FIG. 23 is a perspective view illustrating the housing main body and the cover body, which are partially omitted.
Figure 24:
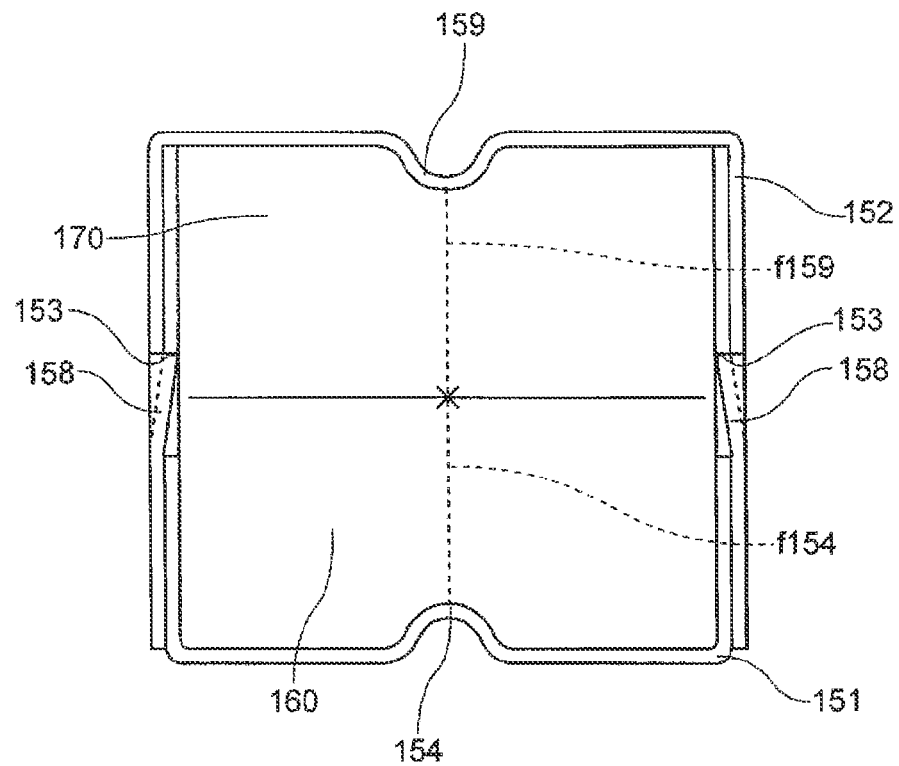
FIG. 24 is a front view illustrating a principal part of the optical module package in FIG. 21.
Figure 25:
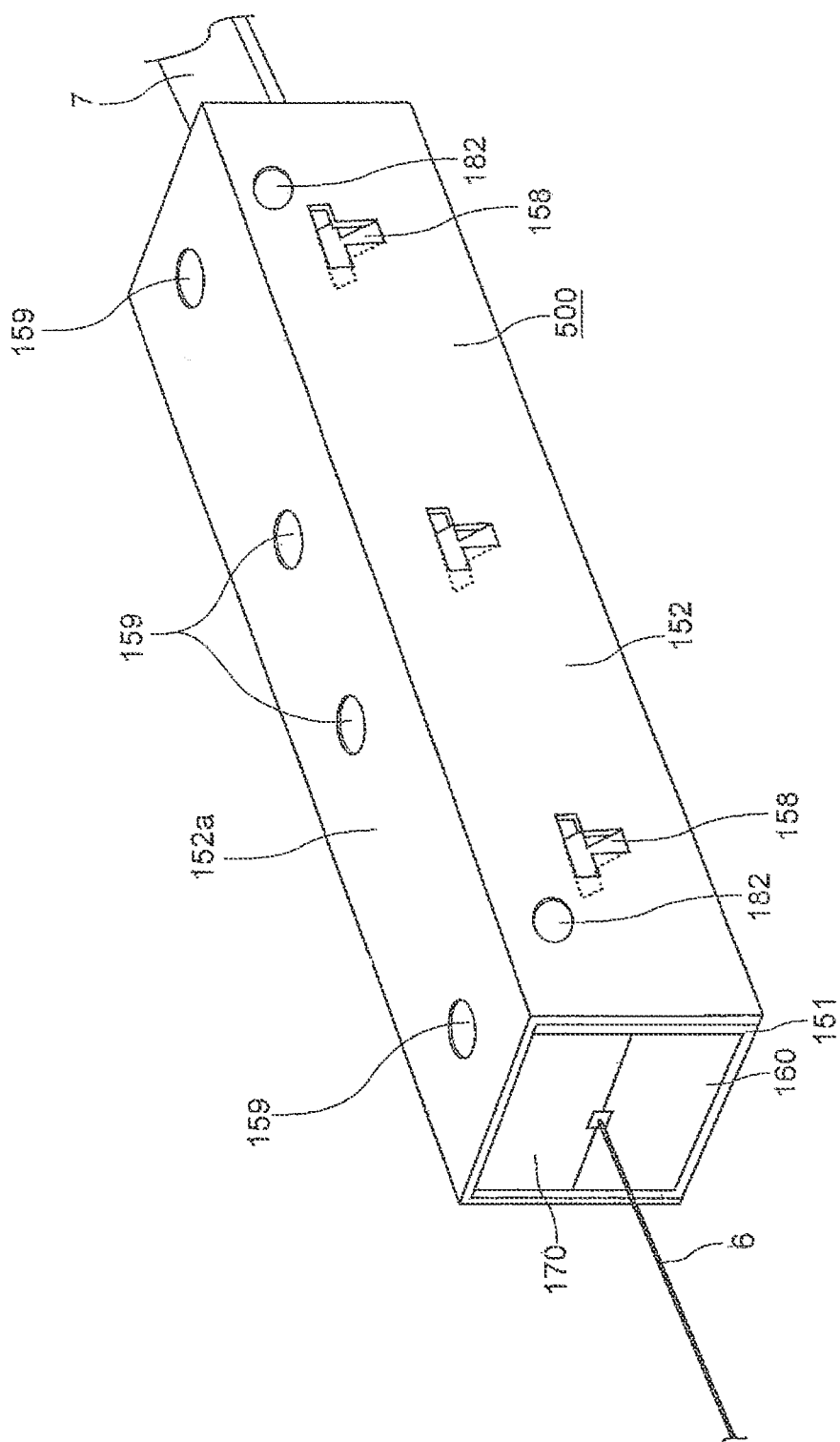
FIG. 25 is a perspective view illustrating the optical module package in FIG. 21.
Figure 27:
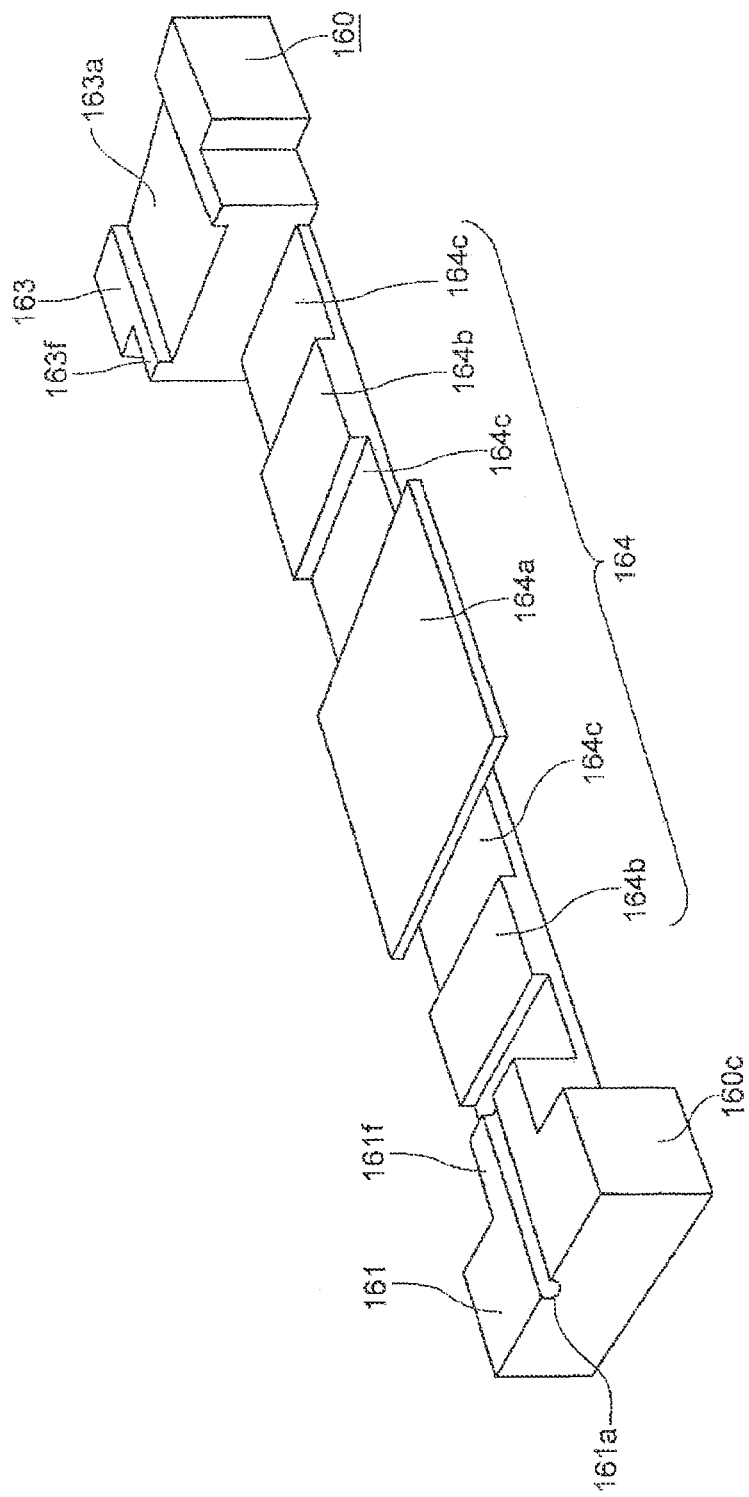
FIG. 27 is a perspective view illustrating the first holding member 160 of the optical module package in FIG. 21.

To begin with, the structure of an optical module package 500 according to the forth embodiment of the present invention will be explained with reference to FIG. 21 to FIG. 25, FIG. 27. Here, FIG. 21 is an exploded perspective view illustrating the optical module package 500 according to the forth embodiment. FIG. 22 is a sectional view illustrating the optical module package 500, which is cut along the long side direction at the center of short side direction. FIG. 23 is a perspective view illustrating the housing main body 151 and the cover body 152, which are partially omitted respectively. FIG. 24 is a front view illustrating a principal part of the optical module package 500. FIG. 25 is a perspective view illustrating the optical module package 500. FIG. 27 is a perspective view illustrating the first holding member 160.

The optical module package 500 includes a housing 151A having the housing main body 151 and the cover body 152, the fiber unit 99, the first holding member 160 and the second holding member 170.

In the optical module package 500, bottom locking projections 154 of the housing main body 151 and top end locking projections 159 of the cover body 152 lock the first holding member 160 and the second holding member 170 respectively to restrict their movements. Thus, the optical module package 500 can be manufactured without using an adhesive or resin to fix the fiber unit 99 to the housing 151A nor inserting the optical fiber into a tubular member, resulting in reduction in time and effort required for manufacture.

The housing main body 151 is a U-figure like body which is formed in a substantially (e.g., almost) U-Figure shape similarly to the above-described housing main body 1. The housing main body 151 is different in that four bottom locking projections 154 are formed in place of the two bottom locking projections 4, in that locking holes 153 are formed in place of the wall locking projections 3, and in that alignment parts 181 are formed, as compared with the housing main body 1.

Each of the bottom locking projections 154 is formed by locally projecting a main body bottom part 1a from the outside to the inside. Unlike the bottom locking projections 4, all of the four bottom locking projections 154 are arranged at positions where they are brought into contact with a bottom part 160e of the first holding member 160. Two of the four bottom locking projections 154 are arranged near both sides in the long side direction, and the other two are arranged near the middle in the long side direction.

The locking holes 153 are through holes formed by cutting portions of main body wall parts 1b, 1c into a rectangular shape. Three locking holes 153 are formed in each of the main body wall parts 1b, 1c. The locking holes 153 are arranged at almost regular intervals along the long side direction of the main body wall parts 1b, 1c.

The alignment parts 181 are formed by locally projecting the main body wall parts 1b, 1c from the outside to the inside or the like. The alignment parts 181 are formed at positions corresponding to later-described reduced-width parts 161f, 163f near both sides in the long side direction of the main body wall parts 1b, 1c respectively.

The cover body 152 is a U-figure like body which is formed in a substantially (e.g., almost) U-Figure shape similarly to the above-described cover body 2. The cover body 152 is different in that four top end locking projections 159, in that engaging claws 158 are formed in place of the engaging projections 8, and in that alignment parts 182 are formed, as compared with the cover body 2.

The top end locking projections 159 are formed, as with the above-described bottom locking projections 4, by locally projecting a top end part 152a from the outside to the inside or the like. Further, all of the four top end locking projections 159 are arranged at positions where they are brought into contact with a bottom part 170e of the second holding member 170. Two of the four top end locking projections 159 are arranged near both sides in the long side direction of the top end part 152a, and the other two are arranged near the middle in the long side direction.

In the optical module package 500, when the cover body 152 is put over the housing main body 151, the four top end locking projections 159 and the four bottom locking projections 154 oppose each other along the vertical direction from the top end part 152a to the main body bottom part 1a. Thus, a space 176 sandwiched between the top end locking projections 159 and the bottom locking projections 154 is secured in the optical module package 500 as illustrated in FIG. 22, so that the space 176 is set as the accommodating space for the first, second holding members 160, 170.

Further, in the optical module package 500, the arrangement pattern of the four bottom locking projections 154 and the arrangement pattern of the four top end locking projections 159 are in common. More specifically, the number of the bottom locking projections 154 and the number of the top end locking projections 159 are equal to be four, and the positional relationship (of the positions on the bottom part 1a) between the bottom locking projections 154 and the positional relationship (of the positions on the top end part 152a) between the top end locking projections 159 are in common. Thus, the each top end locking projection 159 is arranged at position opposing the each bottom locking projection 154 as illustrated in FIG. 23. Therefore, given that there is a straight line linking each top end locking projection 159 and each bottom locking projection 154 in the optical module package 500, this straight line is perpendicular to the main body bottom part 1a and the top end part 152a.

Further, the housing main body 151 and the cover body 152 have an unevenly arranged structure regarding to the arrangements of the bottom locking projections 154 and the top end locking projections 159. The unevenly arranged structure in this embodiment means a structure in which the bottom locking projections 154 and the top end locking projections 159 are not arranged at regular intervals on the main body bottom part 1a and the top end part 152a respectively, but unevenly arranged at specific positions. In the case of the optical module package 500, the unevenly arranged structure means a structure in which the bottom locking projections 154 are arranged at positions corresponding to later-described device locking parts 164a, 174a of the first, second holding members 160, 170 but not arranged at positions corresponding to connector locking parts 164b, 174b (see FIG. 22).

In the optical module package 500, by putting the cover body 152 over the housing main body 151, the top end part 152a is able to be brought into contact with open end parts 1e of the main body wall parts 1b, 1c which do not continue to the main body bottom part 1a. In this event, the interval between each top end locking projection 159 and each bottom locking projection 154 corresponding thereto along the vertical direction (the interval between their portions projecting farthest) is slightly smaller than the arrangement interval between the two bottom surfaces 160e and 170e in the first, second holding members 160, 170.

The engaging claws 158 are claw-shaped portions formed by making almost T-figure shaped cuts in cover wall parts 152b, 152c and folding the inside of the cuts toward the inside of the cover wall parts 152b, 152c using lower end portions of the cuts as folding lines. Three engaging claws 158 are formed in each of the cover wall parts 152b, 152c, and are arranged at positions corresponding to the locking holes 153 of the housing main body 151. Each of the engaging claws 158 is formed in a size according to the locking hole 153.

The alignment parts 182 are formed by locally projecting the cover wall parts 152b, 152c from the outside to the inside or the like. The alignment parts 182 are formed at positions corresponding to the alignment parts 181 of the housing main body 151, and shapes of the alignment parts 182 also correspond to those of the alignment parts 181. When the cover body 152 is put over the housing main body 151, the each alignment part 182 engages with the each alignment part 181 from the outside.

The first holding member 160 is different in that it has raised parts 161, 163 in place of the raised parts 11, 13 and in that it has a device receiving part 164 as illustrated in detail in FIG. 27, as compared with the first holding member 10. The bottom part 160e of the first holding member 160 corresponds to the opposing surface in the present disclosure together with the later-described bottom surface 170e.

The raised part 161 has a fiber receiving part 161a, similar to the fiber receiving part 11a, formed in a surface thereof. The raised part 161 further has side surfaces 160c, 160d similar to the side surfaces 10c, 10d, and a portion connecting to the device receiving part 164 is the reduced-width part 161f with a narrow width.

The raised part 163 has a fiber receiving part 163a, similar to the fiber receiving part 13a, formed in a surface thereof. The raised part 163 further has side surfaces 160c, 160d similar to the side surfaces 10c, 10d, and a portion connecting to the device receiving part 164 is the reduced-width part 163f with a narrow width.

The device receiving part 164 has the device locking projection 164a, connector locking projections 164b, and a base part 164c. The device locking projection 164a is a portion which is formed on the base part 164c at the middle in the long side direction thereof, and is made slightly lager in thickness and also in width than the base part 164c. The connector locking projection 164b is formed respectively at a position on each side of the device locking projection 164a on the base part 164c and distanced from the device locking projection 164a. The base part 164c is a band-shaped portion small in thickness connecting the reduced-width part 161f with the reduced-width part 163f.

The second holding member 170 is different in that it has raised parts 171, 173 in place of the raised parts 31, 33 and in that it has a device receiving part 174, as compared with the second holding member 30.

The raised part 171 has a fiber receiving part 171a, similar to the fiber receiving part 31a, formed in a surface thereof. The raised part 171 further has side surfaces 170c, 170d similar to the side surfaces 30c, 30d, and a portion connecting to the device receiving part 174 is a reduced-width part 171f with a narrow width.

The raised part 173 has a fiber receiving part 173a, similar to the fiber receiving part 33a, formed in a surface thereof. The raised part 173 further has side surfaces similar to the side surfaces 30c, 30d, and a portion connecting to the device receiving part 174 is a reduced-width part 173f with a narrow width.

The device receiving part 174 has a device locking projection 174a, connector locking projections 174b, and a base part 174c. The device locking projection 174a is a portion which is formed on the base part 174c at the middle in the long side direction thereof, and is made slightly lager in thickness and also in width than the base part 174c. The connector locking projection 174b is formed at a position on each side of the device locking projection 174a on the base part 174c and distanced from the device locking projection 174a. The base part 174c is a band-shaped portion small in thickness connecting the reduced-width part 171f with the reduced-width part 173f.

The first, second holding members 160, 170 are able to be made to oppose each other with the surfaces of the raised part 161, raised part 171 in direct contact with each other and the surfaces of the raised part 163, raised part 173 in direct contact with each other. Thus, a space in which the fiber receiving parts 161a, 171a, the device receiving parts 164, 174, and the fiber receiving parts 163a, 173a are united together is formed. This space has a shape capable of accommodating the fiber unit 99 locked by the device receiving parts 164, 174, as with the unit accommodating part 15.

In the fiber unit 99, an optical fiber member 6 and a tape-shaped optical fiber member 7 are connected to an optical waveguide device 95 which are united together. The optical waveguide device 95 has an optical waveguide substrate 95a and fiber connectors 95b, 95c, and it has a structure that the waveguide substrate 95a and fiber connectors 95b, 95e are united together.

The optical waveguide substrate 95a is different in outer shape from the optical waveguide substrate 6b, but has an optical waveguide similar to that of the optical waveguide substrate 5b. The optical waveguide substrate 95a is formed of, for example, alumina crystal. The fiber connectors 95b, 95c are different in outer shape from the fiber connectors 5b, 5c, but are fixed to the optical waveguide substrate 95a using a not-illustrated adhesive as with the fiber connectors 5c, 5d. The fiber connectors 95b, 95c are formed of, for example, quartz.

The optical module package 500 is formed by accommodating the above-described pair of first, second holding members 160, 170 and fiber unit 99 in the housing main body 151 and putting the cover body 152 over housing main body 151 from the upper side.

In this case, for example, the first holding members 160 is first accommodated in the housing main body 151, and thereafter the fiber unit 99 is accommodated in the first holding members 160. Next, the second holding member 170 is overlapped on the first holding members 160 to hold the fiber unit 99 sandwiched between the first and second holding members 160 and 170. Thereafter, the cover body 152 is put over the housing main body 151, and the each engaging claw 158 is fitted into and engaged with the each locking holes 153. Thus, the optical module package 500 is completed.

Operation and Effect of Optical Module Package 500

As in the foregoing, since the optical module package 500 is configured such that the fiber unit 99 is held by the housing 151A in an almost U-figure shape as in the optical module package 200, effort and time required for manufacture are able to be reduced as with the optical module package 200.

Further, all of the four bottom locking projections 154 are arranged at positions where they are brought into contact with the bottom part 160e of the first holding member 160 and all of the four top end locking projections 159 are arranged at positions where they are brought into contact with the bottom part 170e of the second holding member 170. Therefore, by accommodating the first, second holding members 160, 170 in the housing main body 151 and putting the cover body 152 over the housing main body 151 from the upper side, the first, second holding members 160, 170 are able to be held sandwiched between the four bottom locking projections 154 and the four top end locking projections 159.

Therefore, in the optical module package 500, the bottom locking projections 154 and the top end locking projections 159 are able to restrict the movements of the first, second holding members 160, 170 to prevent them from moving in the short side direction as well as in the long side direction.

In addition, the interval between each top end locking projection 159 and each bottom locking projection 154 is slightly smaller than the arrangement interval between the bottom surfaces 160e and 170e of the first, second holding members 160, 170. Accordingly, the four bottom locking projections 154 and the four top end locking projections 159 not only come into contact with the bottom surfaces 160e, 170e but also press them while biting them, and therefore can more firmly hold the first, second holding members 160, 170.

Further, the device locking projections 164a, 174a and the connector locking projections 164b, 174b of the device receiving parts 164, 174 separately lock the optical waveguide substrate 95a and the fiber connectors 95b, 95c. The optical waveguide substrate 95a and the fiber connectors 95b, 95c are formed of different materials and therefore different in magnitude of expansion and contraction with temperature change.

Accordingly, even if one united plane is brought into contact with the optical waveguide substrate 95a and the fiber connectors 95b, 95, the plane possibly decreases in force of holding the optical waveguide substrate 95a due to occurrence of distortion in the plane accompanying the difference in magnitude of expansion and contraction. In this regard, since the device locking projections 164a, 174a in contact with the optical waveguide substrate 95a and the connector locking projections 164b, 174b in contact with the fiber connectors 95b, 95c are formed at distant positions in the optical module package 500, there is no possibility of decrease in the holding force accompanying the difference in magnitude of expansion and contraction between the optical waveguide substrate 95a and the fiber connectors 95b, 95c.

In addition, the bottom locking projections 154 and the top end locking projections 159 are arranged in the unevenly arranged structure. The optical waveguide substrate 95a and the fiber connectors 95b, 95c are different in magnitude of expansion and contraction with temperature change. Therefore, if the bottom locking projections 154 and the top end locking projections 159 are formed also at positions corresponding to the connector locking parts 164b, 174b, distortion accompanying the difference in magnitude of expansion and contraction is likely to occur at a portion where the bottom locking projections 154 and the top end locking projections 159 are in contact with the first, second holding members 160, 170, thereby possibly decreasing the holding force of the housing main body 151 and the cover body 152.

However, since the bottom locking projections 154 and the top end locking projections 159 are arranged in the unevenly arranged structure in the optical module package 500, there is no possibility of decrease in the holding force as described above, and the housing main body 151 and the cover body 152 are able to surely hold the first, second holding members 160, 170.

Further, since the housing main body 151 and the cover body 152 have the alignment parts 181, 182 respectively, alignment of the housing main body 151 and the cover body 152 can be easily and surely performed.

Further, the alignment parts 181, 182 project into the housing main body 151 and the cover body 152 but do not come into contact with the first, second holding members 160, 170 because they are formed at positions corresponding to the reduced-width parts 161f, 163f. If the alignment parts 181, 182 are formed at positions where they are brought into contact with the first, second holding members 160, 170, the force of the bottom locking projections 154 and the top end locking projections 159 pressing the first, second holding members 160, 170 changes due to the change in shape of the first, second holding members 160, 170 or the like accompanying the pressure from the alignment parts 181, 182, and the force of the housing main body 151 and the cover body 152 holding the first, second holding members 160, 170 possibly decreases as a whole.

However, since the first, second holding members 160, 170 are not pressed by the alignment parts 181, 182 in the optical module package 500, the holding force of the housing main body 151 and the cover body 152 does not decrease.

Further, the arrangement pattern of the top end locking projections 159 and the arrangement pattern of the bottom locking projections 154 are in common. Therefore, as illustrated in FIG. 24, a pressure f159 applied to the second holding member 170 from the top end locking projections 159 and a pressure f154 applied to the first holding member 160 from the bottom locking projections 154 are substantially equal in magnitude and having opposite direction, and directed to the same position from opposite directions. Therefore, the pressure f159 and the pressure f154 cancel out each other to generate no moment, so that the first, second holding members 160, 170 can be more stably held by the housing 151A.

As in the foregoing, it is not necessary to use an adhesive or resin to fix the fiber unit 99 to the housing 151A in the optical module package 500, effort and time required for manufacture are able to be reduced.

Modified Example of the Fourth Embodiment

Figure 26:
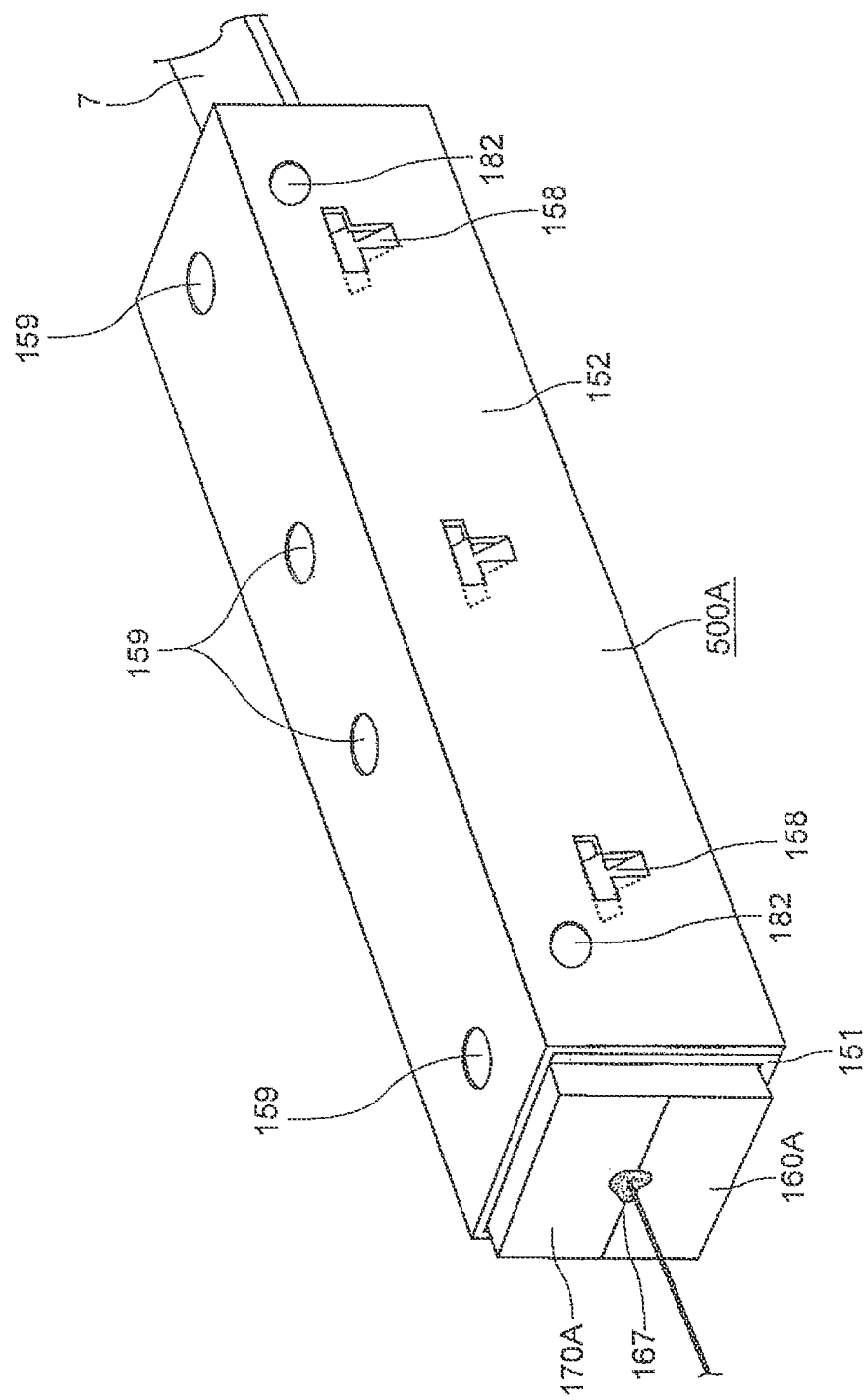
FIG. 26 is an exploded perspective view illustrating the optical module package according to a modified example.

An optical module package 500A according to a modified example will now be explained with reference to FIG. 26. The optical module package 500A is different in that it has the first, second holding members 160A, 170A in place of the first, second holding members 160, 170, as compared with the optical module package 500. Since lengths in the long side direction in raised parts 161,163,171,173 of the first, second holding members 160A, 170A are longer than those of the first, second holding members 160, 170, edge parts of the long side direction in the first, second holding members 160A, 170A protrude from the housing 151A.

In the optical module package 500A, the optical fiber member 6 are fixed to protruding portions of the first, second holding members 160A, 170A using an adhesive 167.

Since it is not necessary to use an adhesive or resin to fix the fiber unit 99 to the housing 151A also in the optical module package 500A, effort and time required for manufacture can be further reduced.

In addition, in the optical module package 500A, the optical fiber member 6 are unlikely to come into contact with the housing 151A when the optical fiber member 6 are bent, and there is no possibility that the optical fiber member 6 enter the gap between the first and second holding members 160A and 170A, as in the optical module package 300A.

The four bottom locking projection 154 and the four top end locking projection 159 are formed in the optical module packages 500, 500A respectively. It is sufficient to form at least one each of the bottom locking projection 154 and the top end locking projection 159.

This disclosure is not limited to the foregoing embodiments but various changes and modifications of its components may be made without departing from the scope of the present disclosure. Besides, it is clear that various embodiments and modified examples of the present disclosure can be carried out on the basis of the foregoing explanation. Therefore, the present disclosure can be carried out in modes other than the above-mentioned modes.

What is claimed is:
1. An optical module package in which an optical waveguide device formed by an optical waveguide and an optical fiber connected to the optical waveguide device are accommodated in a housing and the optical fiber and the optical waveguide device are held in the housing a unit holding member, the optical module package comprising:
    a fiber unit including the optical waveguide device and the optical fiber connected to each other,
    a unit holding member including a first holding member and a second holding member, the first holding member and the second holding member forming, inside thereof, a unit accommodating portion to accommodate the fiber unit and lock the fiber unit in a direct opposing state of opposing each other in direct contact with each other; and
    a housing having a housing main body in which the fiber unit is accommodated together with the unit holding member while the optical fiber is kept extending along an axial core direction, and a cover body which covers the housing main body,
    wherein the housing main body or the cover body has a plurality of locking parts, the plurality of locking parts are
        formed at an interval according to an arrangement interval between two opposing outer surfaces of the unit holding member and arranged to oppose each other, or
        formed at positions opposing each other when the cover body is put over the housing main body,
    and a space sandwiched between the plurality of locking parts in the housing main body or the cover body is set as an accommodating space for the unit holding member.
2. The optical module package according to claim 1,
    wherein the housing main body has the plurality of locking parts, and the plurality of locking parts are arranged separated from each other along a long side direction of a long side of the housing main body and have an interval therebetween along the long side direction set to a length according to an arrangement interval between long side opposing surfaces of the long side direction in the two opposing surfaces of the unit holding member.
3. The optical module package according to claim 1,
    wherein each of the housing main body and the cover body has respectively at least one locking part forming a plurality of locking parts, and an arrangement pattern of the locking parts in the housing main body is in common with an arrangement pattern of the locking parts in the cover body.

4. The optical module package according to claim 2, wherein the housing main body includes two bottom locking parts as the plurality of locking parts, the two bottom locking parts formed at a main body bottom part in a U-figure like body formed in a substantially U-figure shape, and includes wall locking parts as the plurality of locking parts, the wall locking parts formed respectively at two main body wall parts connecting to the main body bottom part in the U-figure like body.

5. The optical module package according to claim 3, wherein the housing main body includes a plurality of bottom locking parts forming the locking parts, the bottom locking parts formed at a main body bottom part in a U-figure like body formed in an substantially U-figure shape, and the cover body is formed in a substantially U-figure shape covering the housing main body from above and having two cover wall parts coming into close contact with two main body wall parts connecting to the main body bottom part of the housing main body from outside and a top end part connecting the two cover wall parts, and includes a plurality of top end locking parts as locking parts formed at a top end part.

6. The optical module package according to claim 4, wherein the cover body is formed in a substantially U-figure shape covering the housing main body from above and having two cover wall parts in close contact with the main body wall parts from outside, and a top end part connecting the two cover wall parts, and wherein the cover body includes engaging parts to engage with the wall locking parts from outside, the engaging parts formed respectively at the cover wall parts.

7. The optical module package according to claim 5, wherein when the cover body is put over the housing main body and the top end part is brought into contact with an open end part of the main body wall part not connecting to the main body bottom part, an interval between the top end locking part and the bottom locking part is slightly smaller than an arrangement interval between the two opposing surfaces of the unit holding member.

8. The optical module package according to claim 5, wherein each of the first holding member and the second holding member has a device receiving part facing the unit accommodating part, and the fiber unit is configured such that fiber connectors to which the optical fiber is connected are connected to both sides of the optical waveguide device,
wherein the device receiving part of each of the first holding member and the second holding member is configured such that connector locking parts locking the fiber connectors are formed on both sides of a device locking part locking the optical waveguide device, at positions distanced from the device locking part, and
wherein the cover body has an unevenly arranged structure in which the top end locking parts are arranged at positions according to the device locking part, the tope end locking parts not arranged at positions according to the connector locking parts locking the fiber.

9. The optical module package according to claim 7, wherein each of the first holding member and the second holding member has a device receiving part facing the unit accommodating part, and the fiber unit is configured such that fiber connectors to which the optical fiber is connected are connected to both sides of the optical waveguide device,
wherein the device receiving part of each of the first holding member and the second holding member is configured such that connector locking parts locking the fiber connectors are formed on both sides of a device locking part locking the optical waveguide device, at positions distanced from the device locking part, and
wherein the cover body has an unevenly arranged structure in which the top end locking parts are arranged at positions according to the device locking part, the tope end locking parts not arranged at positions according to the connector locking parts locking the fiber.

10. The optical module package according to claim 1, wherein the housing main body has the accommodating space formed by an accommodating recess part in a tub-like shaped body, and has the plurality of locking parts formed by long side inner wall parts arranged along a long side direction along a long side of the housing main body of inner wall parts facing the accommodating recess part, and the accommodating recess part has a stepped structure including a deep bottom part with a large depth and a shallow bottom part shallower than the deep bottom part arranged outside the deep bottom part, and
wherein the first holding member has a stepped raised part fitted in the accommodating recess part in the tub-like shaped body and having a shape according to the stepped structure of the accommodating recess part, and the two opposing surfaces are formed by two long side end faces along the long side direction of the stepped raised part.

11. The optical module package according to claim 10, wherein the second holding member has a stepped raised part according to the stepped raised part of the first holding member, and
wherein the cover body is formed with a recess part to which the stepped raised part of the second holding member is fitted, and is a tub-like shaped body similar to the housing main body.

12. The optical module package according to claim 11, wherein both of the first holding member and the second holding member are formed in a plate-shape using soft members with rubber elasticity, and
wherein when the first holding member and the second holding member sandwich the fiber unit therebetween, the first holding member and the second holding member are sandwiched at outside thereof between the cover body and the housing main body, and the cover body is attached to the housing main body,
the first holding member and the second holding member come into close contact with the fiber unit while deforming according to the recess parts of the housing main body and the cover body respectively.

13. The optical module package according to claim 3, wherein both of the first holding member and the second holding member have protruding edge parts protruding outward from the cover body and the housing main body.

14. The optical module package according to claim 5, wherein both of the first holding member and the second holding member have protruding edge parts protruding outward from the cover body and the housing main body.

15. The optical module package according to claim 7, wherein both of the first holding member and the second holding member have protruding edge parts protruding outward from the cover body and the housing main body.

16. The optical module package according to claim 10, wherein both of the first holding member and the second holding member have protruding edge parts protruding outward from the cover body and the housing main body.

17. The optical module package according to claim 13, wherein the optical fiber is fixed to the protruding edge parts of the first holding member and the second holding member using an adhesive.

18. The optical module package according to claim 14, wherein the optical fiber is fixed to the protruding edge parts of the first holding member and the second holding member using an adhesive.

19. The optical module package according to claim 15, wherein the optical fiber is fixed to the protruding edge parts of the first holding member and the second holding member using an adhesive.

20. The optical module package according to claim 16, wherein the optical fiber is fixed to the protruding edge parts of the first holding member and the second holding member using an adhesive.

* * * * *